(12) United States Patent
Zhang et al.

(10) Patent No.: US 11,789,544 B2
(45) Date of Patent: Oct. 17, 2023

(54) SYSTEMS AND METHODS FOR COMMUNICATING RECOGNITION-MODEL UNCERTAINTY TO USERS

(71) Applicant: Meta Platforms Technologies, LLC, Menlo Park, CA (US)

(72) Inventors: Ting Zhang, Lake Jackson, TX (US); Aakar Gupta, Redmond, WA (US); Marcello Giordano, Toronto (CA); Tanya Renee Jonker, Seattle, WA (US); Hrvoje Benko, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/575,676

(22) Filed: Jan. 14, 2022

(65) Prior Publication Data

US 2023/0056020 A1   Feb. 23, 2023

Related U.S. Application Data

(60) Provisional application No. 63/234,823, filed on Aug. 19, 2021.

(51) Int. Cl.
*G06F 3/01* (2006.01)
*G06F 18/2415* (2023.01)

(52) U.S. Cl.
CPC .............. *G06F 3/017* (2013.01); *G06F 3/016* (2013.01); *G06F 18/2415* (2023.01)

(58) Field of Classification Search
CPC .......... G06F 3/017; G06F 3/016; G06F 3/013; G06K 9/6277; G01S 13/08; G06T 19/006; G06V 40/20; A61B 5/1114
See application file for complete search history.

(56) References Cited

U.S. PATENT DOCUMENTS

| | | | |
|---|---|---|---|
| 2012/0219180 A1* | 8/2012 | Mehra | G06F 3/013 382/103 |
| 2014/0145936 A1* | 5/2014 | Gu | G06F 3/017 345/156 |
| 2015/0310264 A1* | 10/2015 | Aliseitchik | G06V 40/20 382/103 |
| 2016/0077547 A1* | 3/2016 | Aimone | A61B 5/1114 345/8 |
| 2016/0320854 A1* | 11/2016 | Lien | G01S 13/08 |
| 2020/0074158 A1* | 3/2020 | Kim | G06V 40/20 |
| 2021/0247846 A1* | 8/2021 | Shriram | G06T 19/006 |

* cited by examiner

*Primary Examiner* — Richard J Hong
(74) *Attorney, Agent, or Firm* — Greenberg Traurig, LLP

(57) ABSTRACT

The disclosed computer-implemented method may include (1) receiving information associated with a real-time output of a recognition model adapted to recognize at least one behavior of a user, (2) determining, based on the information, a level of uncertainty associated with the real-time output, (3) modulating at least one attribute of feedback based on the level of uncertainty, and (4) presenting the feedback to the user substantially contemporaneous with the real-time output of the recognition model. Various other methods, systems, and computer-readable media are also disclosed.

20 Claims, 21 Drawing Sheets

SYSTEMS AND METHODS FOR COMMUNICATING RECOGNITION-MODEL UNCERTAINTY TO USERS

CROSS REFERENCE TO RELATED APPLICATION

This application claims the benefit of U.S. Provisional Application No. 63/234,823, filed 19 Aug. 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
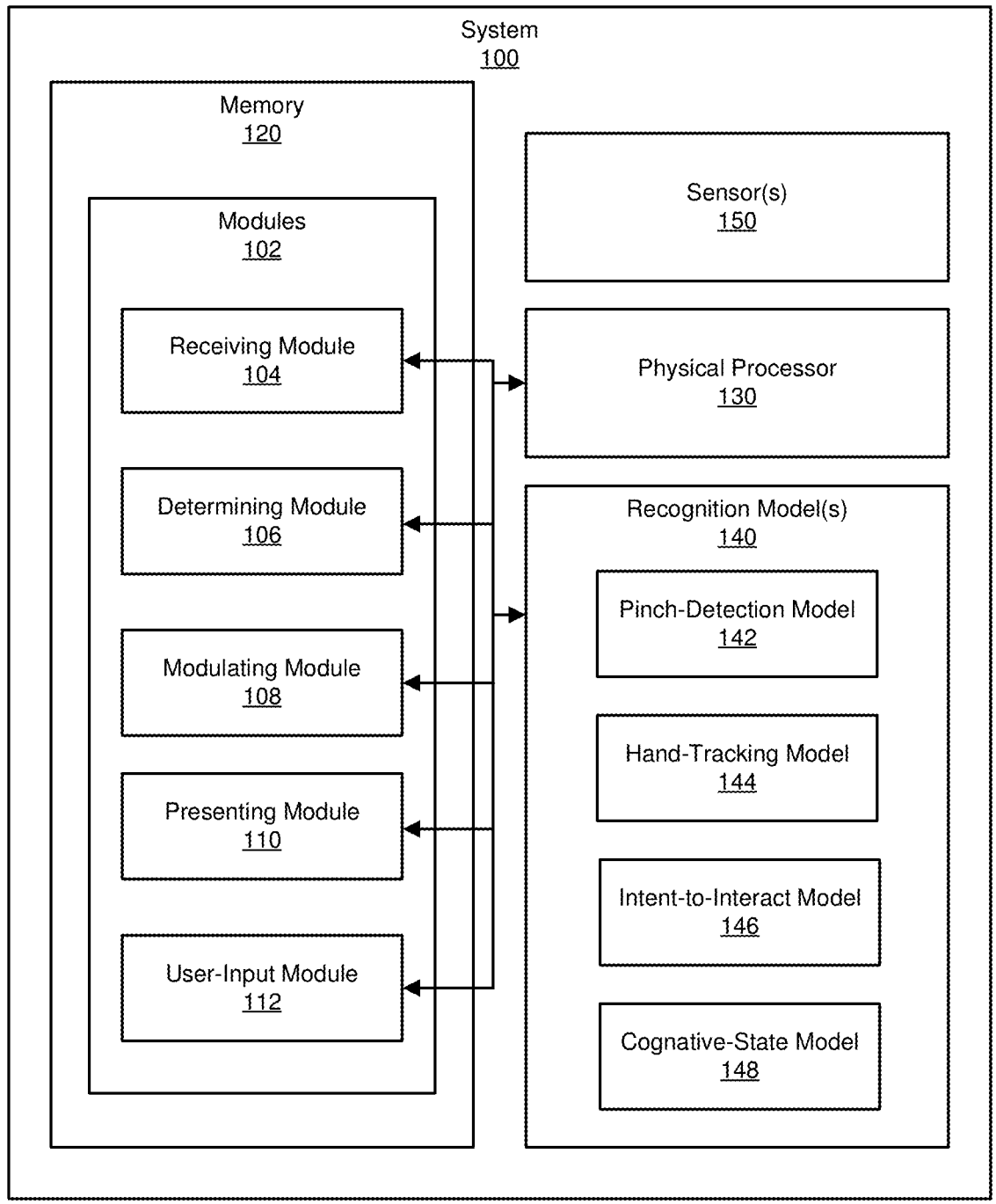
FIG. 1 is a block diagram of an example system for communicating model uncertainty to users.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Users interact with computing systems in a variety of ways to provide input to, or otherwise control, actions performed by the computing systems. Users may interact directly with computing systems using simple physical user-input devices that provide reliable discretized outputs (e.g., key or button press events) to the computing systems. These simple physical user-input devices may be capable of independently providing users with actionable feedback to the users' behaviors. For example, users may provide text input to computing systems using physical keyboards whose keys provide tactile resistance to movement at the points at which they generate discrete outputs. Physical user-input devices that are capable of independently providing a user with immediate feedback may enable the user to confidently provide input to a computing system without needing to verify that each of the user's inputs are properly recognized and responded to by the computing system. For example, physical keyboards may enable many users to provide character input quickly and reliably to a computing system without looking at the keys they are pressing and/or without verifying that individual characters are correctly received and processed by the computing system.

As an alternative to simple physical user-input devices, computing systems may use virtual user-input devices such as virtual keyboards and/or recognition models capable of detecting and reacting to certain user behaviors. In some examples, recognition models, such as gesture recognizers, may output a probability or likelihood that a user performed or is performing a behavior. In order to use probabilities to react to the behavior, a computing system may discretize the probability, typically using a threshold, to determine the onset or occurrence of the behavior. For example, a computing system may use a threshold probability of 0.6 to distinguish occurrences of a behavior from nonoccurrences of the behavior. In cases where the probability of an occurrence of a behavior is very high (e.g., 0.9), the computing system may be relatively certain that the behavior occurred. Likewise, in cases where the probability is very low (e.g., 0.1), the computing system may be relatively certain that the behavior did not occur. However, the computing system may be less certain of probabilities that range around the threshold (e.g., probabilities in the range of 0.5-0.7), which may lead to false-positive and false-negative detections and sporadic mismatches of system responses to users' behaviors.

The present disclosure is generally directed to communicating model uncertainty and related information to users using various forms of actionable real-time feedback. In some embodiments, the systems and methods described herein may use real-time haptic feedback (e.g., modulated vibrations) and/or other types of nonvisual feedback to communicate levels of uncertainty associated with the outputs of recognition models (e.g., recognition models adapted to detect point and select behaviors). Embodiments of the present disclosure may enable a user to understand, in real time, when a computing system is most likely to react correctly to the user's behaviors, which may allow the user to confidently provide input to the computing system with less or no hesitation. Embodiments of the present disclosure may also enable a user to understand, in real time, when the computing system is most likely to react incorrectly to the user's behaviors, which may cause the user to modify certain behaviors to be better recognized by the computing system. In some embodiments, feedback presented to the user may indicate how the user can modify their behaviors to be better recognized by the computing system. By conveying uncertainty information to a user through uncertainty-modulated feedback, embodiments of the present disclosure may enable a user to better understand how a computing system will interpret the user's behaviors, which may reduce the number of recognition errors made by the computing system and lead to improved user-interaction experiences and performance.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIG. 1, detailed descriptions of exemplary systems for communicating model uncertainty to users. The discussions corresponding to FIGS. 2-12 will provide detailed descriptions of corresponding methods and data flows. Finally, with reference to FIGS. 13-21, the following will provide detailed descriptions of various extended-reality systems and components that may implement embodiments of the present disclosure.

FIG. 1 is a block diagram of an example system 100 for communicating model uncertainty to users. As illustrated in this figure, example system 100 may include one or more modules 102 for performing one or more tasks. As will be explained in greater detail below, modules 102 may include a receiving module 104 that receives information associated with real-time outputs of a recognition model. Example system 100 may also include a determining module 106 that determines, based on information received by receiving module 104, levels of uncertainty associated with the real-time outputs of the recognition model. Example system 100 may also include a modulating module 108 that modulates various attributes of feedback based on levels of uncertainty. Additionally, example system 100 may include a presenting module 110 that presents feedback to users substantially contemporaneous with the real-time outputs of the recognition model. In some embodiments, example system 100 may also include a user-input module 112 that performs, or refrains from performing, reactive user-input operations in response to real-time outputs (e.g., recognition events) of the recognition model.

As further illustrated in FIG. 1, example system 100 may also include one or more memory devices, such as memory 120. Memory 120 may include or represent any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 may include or represent any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate the communication of model uncertainties to users. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As further illustrated in FIG. 1, example system 100 may also include one or more recognition models, such as recognition model(s) 140. Recognition model(s) 140 may represent or include any machine-learning model, algorithm, heuristic, data, or combination thereof, that may be used to recognize, detect, calculate, estimate, predict, label, infer, and/or react to user behaviors (e.g., actions, cognitive states, intentions, etc.) and/or effects caused by user behaviors (e.g., device, headset, or controller movements). Examples of recognition model(s) 140 include, without limitation, pinch-detection models (e.g., a pinch-detection model 142) adapted to recognize and/or react to pinch gestures, hand-tracking models (e.g., a hand-tracking model 144) adapted to recognize and/or react to hand states and/or hand movement, models adapted to recognize and/or react to users' intentions to interact (e.g., an intent-to-interact model 146), models adapted to recognize and/or react to transitions between users' cognitive states (e.g., a cognitive-state model 148), gesture-recognition models, eye-tracking models, speech-recognition models, body-sensing models, body-tracking models, physiological-state models adapted to recognize and/or react to users' physiological states, psychological-state models adapted to recognize and/or react to users' psychological states, models for predicting and reacting to users' intents to encode, models adapted to perform inside-out tracking of computing devices, portions of one or more of the same, variations or combinations of one or more of the same, or any other suitable recognition model. In some examples, recognition model(s) 140 may include, without limitation, decision trees (e.g., boosting decision trees), neural networks (e.g., a deep convolutional neural network), deep-learning models, support vector machines, linear classifiers, non-linear classifiers, perceptrons, naive Bayes classifiers, any other machine-learning or classification techniques or algorithms, or any combination thereof.

In some examples, the systems described herein may use one or more of recognition model(s) 140 to recognize and/or react to a user's pointing gestures, selections, or interactions relating to graphical elements displayed to the user via system 100 (e.g., an element of a graphical user interface or an element rendered from a virtual-reality or augmented-reality environment). For example, the systems described herein may use pinch-detection model 142 to detect the moment at which a user intends to make a selection and may use hand-tracking model 144 to determine the graphical element the user is most likely attempting to select.

In some examples, system 100 may include one or more sensors 150 for gathering real-time measurements indicative of user behaviors. Recognition model(s) 140 may use information derived from the measurements gathered from sensors 150 to recognize user behaviors in real time. Examples of sensors 150 include, without limitation, touch sensors, image sensors, proximity sensors, biometric sensors, inertial measurement units, biosensors, heart-rate sensors, saturated-oxygen sensors, neuromuscular sensors, altimeter sensors, temperature sensors, bioimpedance sensors, pedometer sensors, optical sensors, sweat sensors, variations or combinations of one or more of the same, or any other type or form of sensing hardware or software.

Figure 2:
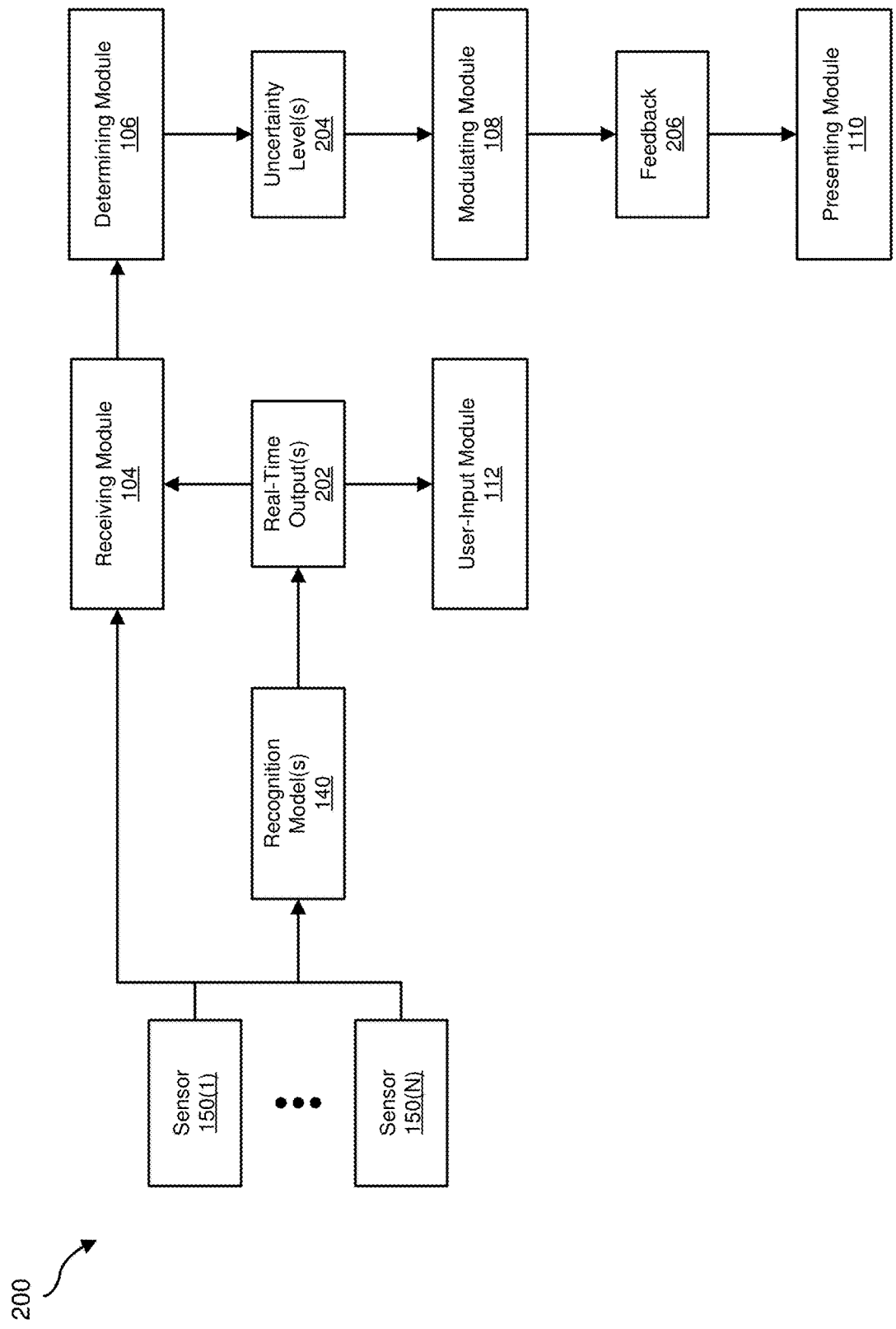
FIG. 2 is a flow diagram of an exemplary data flow for communicating model uncertainty to users.

FIG. 2 is a diagram of an exemplary data flow 200 for communicating levels of uncertainty associated with recognition model(s) 140 to users using one or more of the elements of system 100. In this example, one or more of recognition model(s) 140 may take input from one or more of sensors 150 to generate one or more real-time output(s) 202 (e.g., recognition events) indicative and/or predictive of one or more user behaviors. As shown, receiving module 104 and user-input module 112 may monitor and/or react to real-time output(s) 202. In addition to or as an alternative to monitoring real-time outputs(s) 202, receiving module 104 may monitor some or all of the inputs to recognition model(s) 140 (e.g., measurements of sensor(s) 150) that may be used by recognition model(s) 140 to generate real-time output(s) 202. In some examples, real-time output(s) 202 may represent a time series (e.g., a time series of probabilities of one or more user behaviors, such as probabilities 302 illustrated in FIG. 3).

In some examples, recognition model(s) 140 may be adapted to recognize, detect, calculate, estimate, predict, label, infer, and/or react to one or more user behaviors, and real-time output(s) 202 may represent or include any information indicative of an occurrence or a nonoccurrence of the one or more user behaviors. In some examples, real-time output(s) 202 may include or represent a probability or likelihood that a user is performing a particular behavior (e.g., a pinch or pointing gesture). Additionally or alternatively, recognition model(s) 140 may be adapted to recognize many user behaviors, and real-time output(s) 202 may include or represent a label or classification of a behavior that the user is likely to be performing and/or a confidence level or score associated with the label or classification. In some examples, recognition model(s) 140 may be adapted to estimate, predict, and/or infer various attributes of one or more user behaviors, and real-time output(s) 202 may represent or include one or more estimated attributes of the behavior (e.g., a predicted position, orientation, or state) and/or a confidence level or score associated with the estimated attributes.

In some examples, user-input module 112 may be adapted to perform user-input operations and/or otherwise respond to associated user behaviors indicated by real-time output(s) 202. Examples of user-input operations that may be performed by user-input module 112 in response to real-time output(s) 202 include, without limitation, updating a cursor's position based on a user behavior indicated by real-time output(s) 202 (e.g., a pointing gesture), making a selection based on a user behavior indicated by real-time output(s) 202 (e.g., a pinch gesture), updating a state of a virtual character or environment to reflect a user behavior indicated by real-time output(s) 202, displaying user input associated with a user behavior indicated by real-time output(s) 202 via a graphical user interface element, processing user input associated with a user behavior indicated by real-time output(s) 202, storing user input associated with a user behavior indicated by real-time output(s) 202, triggering an action or function associated with a user behavior indicated by user input associated with real-time output(s) 202, passing user input associated with a user behavior indicated by real-time output(s) 202 to another function or application for further processing, and/or transmitting user input associated with a user behavior indicated by real-time output(s) 202 to another computing system for further processing.

As shown in FIG. 2, receiving module 104 may monitor real-time output(s) 202 and/or any information associated with recognition model(s) 140 and/or real-time output(s) 202 that may be directly and/or indirectly indicative of uncertainties relating to real-time output(s) 202 and/or the interpretations of real-time output(s) 202. For example, receiving module 104 may receive information associated with sensors 150 that may be indicative of the reliability of the measurements of sensors 150 and/or information associated with real-time output(s) 202 (e.g., a probability or confidence level). Determining module 106 may use information gathered by receiving module 104 to determine or calculate one or more uncertainty level(s) 204 associated with real-time output(s) 202. Modulating module 108 may then use uncertainty level(s) 204 to modulate at least one attribute of appropriate feedback to be presented by presenting module 110.

Figure 3:
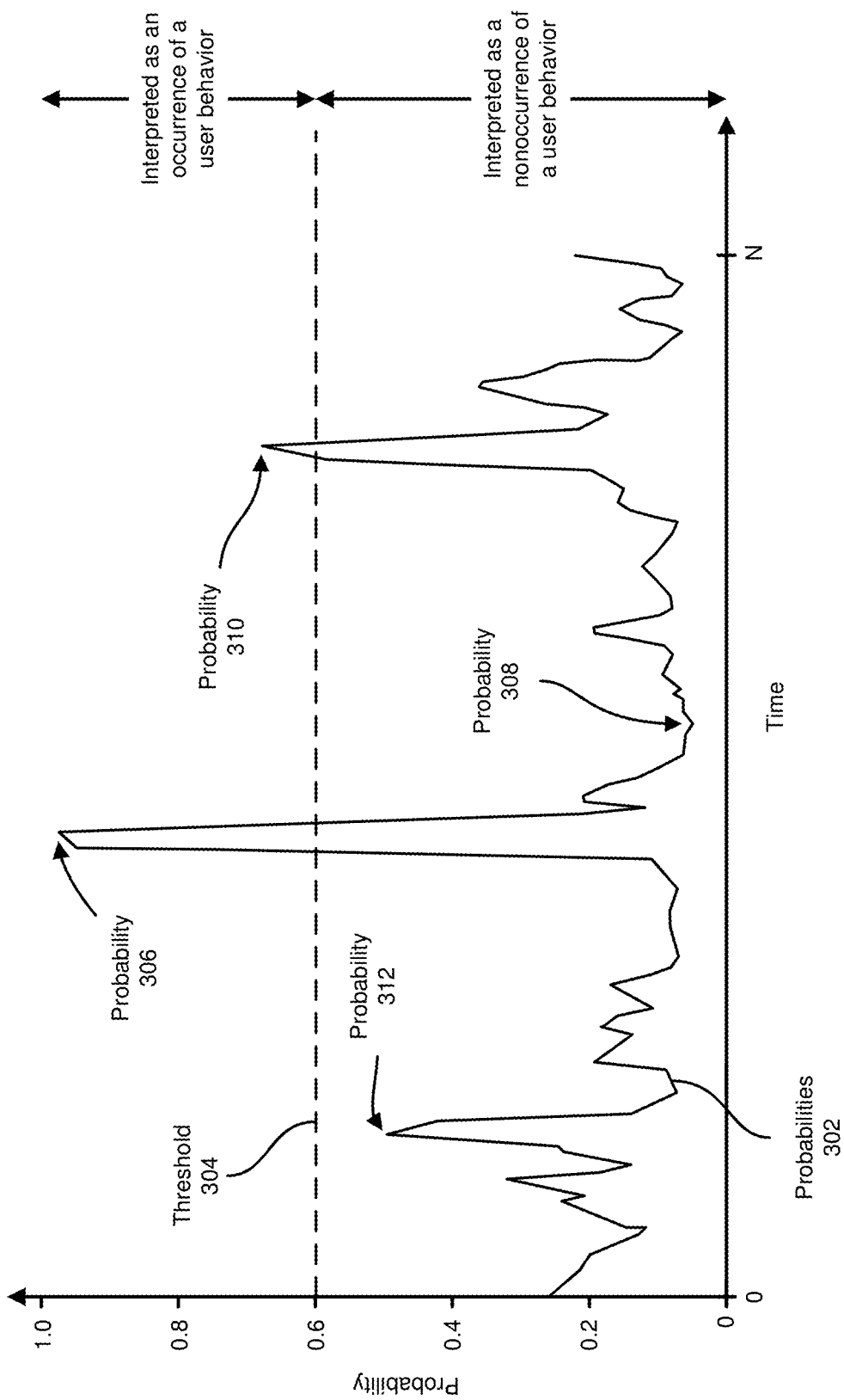
FIG. 3 is a diagram of an exemplary time series of probabilities.

As mentioned above, real-time output(s) 202 of recognition model(s) 140 may include a time series of probabilities indicative of occurrences and/or nonoccurrences of certain user behaviors. FIG. 3 is an illustration of an exemplary time series of probabilities 302. Each of probabilities 302 may represent a probability that a user is performing a behavior (e.g., a pinch gesture) at a corresponding moment in time. In this example, the disclosed systems may use a threshold 304 (e.g., 0.6) to distinguish occurrences of the behavior from nonoccurrences of the behavior. For example, the disclosed systems may treat probabilities greater than threshold 304 as occurrences of the behavior and probabilities less than threshold 304 as nonoccurrences of the behavior. In cases where a probability of an occurrence of the behavior is very high (e.g., probability 306), the disclosed systems may be relatively certain that the behavior occurred and may react accordingly. Likewise, in cases where a probability is very low (e.g., probability 308), the disclosed systems may be relatively certain that the behavior did not occur and may react accordingly. However, the disclosed systems may be less certain of probabilities that range around threshold 304 (e.g., probabilities 310 and 312) and may react in a way that conflicts with a user's intentions. For example, the disclosed systems may react to probability 310 as if the user is performing the behavior even if the user is not actually performing the behavior. Similarly, the disclosed systems may react to probability 312 as if the user is not performing the behavior even if the user is performing the behavior. As will be explained in greater detail below, the disclosed systems may use various forms of feedback to convey levels of uncertainty associated with probabilities 302 to the user, which may cause the user to adapt subsequent behavior such that future levels of uncertainty associated with the behavior are reduced.

Figure 4:
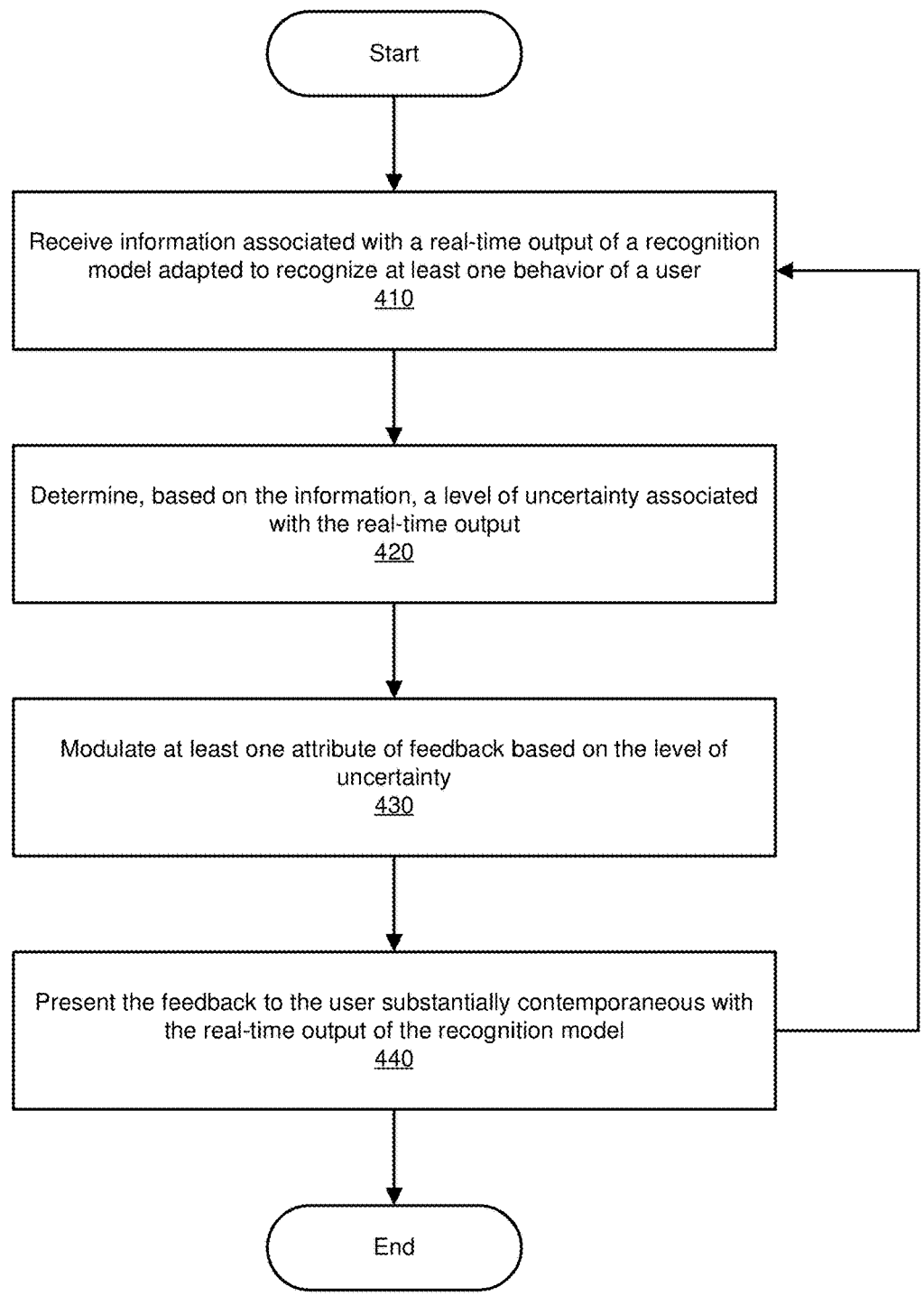
FIG. 4 is a flow diagram of an exemplary method for communicating model uncertainty to users.

FIG. 4 is a flow diagram of an exemplary computer-implemented method 400 for communicating model uncertainty to users. The steps shown in FIG. 4 may be performed by any suitable computer-executable code and/or computing system, including the system(s) illustrated in FIG. 1. In one example, each of the steps shown in FIG. 4 may represent an algorithm whose structure includes and/or is represented by multiple sub-steps, examples of which will be provided in greater detail below. In some examples, the steps of computer-implemented method 400 may be performed repeatedly. For example, the steps of computer-implemented method 400 may be performed once for each of a recognition model's real-time outputs.

As illustrated in FIG. 4, at step 410 one or more of the systems described herein may receive information associated with a real-time output of a recognition model adapted to recognize at least one behavior of a user. For example, receiving module 104 may receive some or all of the information associated with real-time output(s) 202, as described in connection with FIG. 2.

The systems described herein may receive and/or monitor various types of information that may be indicative of an uncertainty associated with a real-time output of a recognition model. In one example, a recognition model may output indications of the uncertainties associated with its outputs (e.g., probabilities, certainty levels, confidence scores, etc.), and receiving module 104 may monitor this information in real time. In some examples, certain characteristics (e.g., a signal-to-noise ratio) of a recognition model's inputs may cause or influence uncertainties associated with the recognition model's real-time outputs, and receiving module 104 may monitor these characteristics in real time. In at least one example, the disclosed systems may use one or more thresholds to discretize and/or interpret a recognition model's outputs. For example, user-input module 112 may use threshold 304 to discretize and/or interpret probabilities 302. A threshold may influence and/or be indicative of a level of uncertainty associated with a recognition model's real-time outputs. For at least this reason, receiving module 104 may identify any thresholds used to discretize and/or interpret a recognition model's outputs.

At step 420 one or more of the systems described herein may determine, based on the information received at step 410, a level of uncertainty associated with the real-time output. For example, determining module 106 may determine uncertainty level(s) 204 based on information received by receiving module 104, as shown in FIG. 2.

The systems described herein may determine uncertainty levels associated with the real-time outputs of a recognition model in a variety of ways. In some examples, a recognition model may output metrics of uncertainty, and the disclosed systems may determine a level of uncertainty associated with a real-time output from the recognition model itself. For example, when a real-time output includes a probability, a certainty level, or a confidence score, the disclosed systems may determine a level of uncertainty based on the probability, the certainty level, or the confidence score. In some examples, if a probability indicates a likelihood that a user behavior is occurring, the disclosed systems may generate an uncertainty level for the probability that is inversely proportional to the probability (i.e., high probabilities may be associated with low uncertainty levels and low probabilities may be associated with high uncertainty levels). Similarly, if a certainty level or a confidence score associated with a real-time output of a recognition model indicates a likelihood that the real-time output is accurate, the disclosed systems may generate an uncertainty level for the real-time output that is inversely proportional to the certainty level or the confidence score (i.e., high certainty levels or confidence scores may be associated with low uncertainty levels and low certainty levels or confidence scores may be associated with high uncertainty levels).

Figure 5:
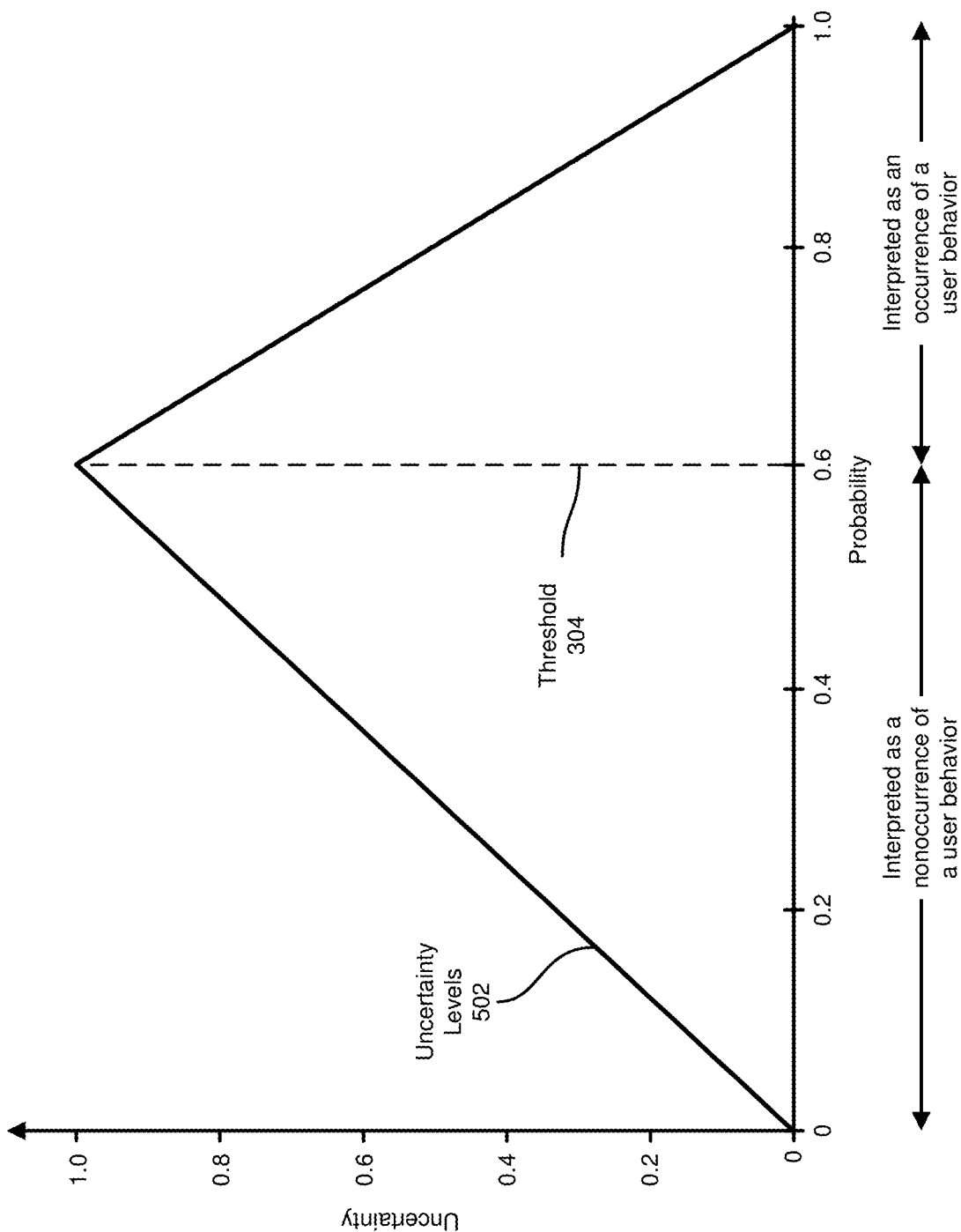
FIG. 5 is a diagram of an exemplary relationship between levels of uncertainty and probabilities.

In some examples, probabilities may reflect a likelihood that a user behavior is or is not occurring, and the disclosed systems may use one or more threshold probabilities (e.g., threshold 304 in FIG. 3) to differentiate probabilities that will be interpreted as occurrences of the user behavior from probabilities that will be interpreted as nonoccurrences of the user behavior. In these examples, the disclosed systems may use the threshold to determine a level of uncertainty associated with a probability. For example, the disclosed systems may generate a level of uncertainty for a probability that is inversely proportional to a distance between the probability and the threshold (i.e., probabilities furthest from the threshold may be associated with low uncertainty levels and probabilities closest to the threshold may be associated with high uncertainty levels). In at least one example, the disclosed systems may determine an uncertainty level for a probability as shown in Equation (1):

$$\text{uncertainty} = \begin{cases} 1 - \dfrac{\text{threshold} - \text{probability}}{\text{threshold}}, & \text{probability} < \text{threshold} \\ 1 - \dfrac{\text{probability} - \text{threshold}}{1 - \text{threshold}}, & \text{probability} \geq \text{threshold} \end{cases} \quad (1)$$

where uncertainty is a level of uncertainty ranging between 0 (indicating low uncertainty) and 1 (indicating high uncertainty), where probability is a single probability, and where threshold is a threshold used to interpret probabilities as occurrences of a behavior or nonoccurrences of the behavior. FIG. 5 illustrates exemplary uncertainty levels 502, which may be derived using Equation (1) and threshold 304 from FIG. 3. As can be seen, the uncertainty level associated with each probability may be inversely proportional to the distance between the probability and threshold 304. In this example, the probabilities associated with the highest uncertainty levels are those closest to threshold 304, and the probabilities associated with the lowest uncertainty levels are those furthest from threshold 304.

In some examples, certain characteristics (e.g., a signal-to-noise ratio) of a recognition model's inputs may cause or influence uncertainties associated with the recognition model's real-time outputs. In such examples, the disclosed systems may generate or adjust a level of uncertainty for a real-time output based at least in part on such characteristics and their contributions to uncertainty.

At step 430 one or more of the systems described herein may modulate at least one attribute of feedback based on the level of uncertainty determined at step 420. For example, modulating module 108 may modulate at least one attribute of feedback 206 based on uncertainty level(s) 204 associated with real-time output(s) 202.

The systems described herein may use various forms of sensory feedback to indicate and/or convey levels of uncertainty associated with the real-time outputs of recognition models and/or to attempt to cause users to improve levels of uncertainty associated with the real-time outputs of recognition models. In one example, the disclosed systems may use any suitable type or form of haptic feedback such as vibrations, forces, pressures, tractions, textures, and/or temperatures to communicate information about levels of uncertainty. In some examples, the disclosed systems may use any suitable type or form of nonvisual feedback, such as audio feedback, to communicate information about levels of uncertainty. In at least one example, the disclosed systems may use a form of visual feedback to communicate information about levels of uncertainty.

The systems described herein may modulate various attributes of feedback to communicate information about levels of uncertainty. For example, the disclosed systems may modulate feedback amplitudes, feedback frequencies, feedback durations, feedback patterns, feedback spatializations, feedback locations, feedback strengths, feedback effects, feedback intensities, variations or combinations of one or more of the same, or any other perceptible attributes of feedback.

The systems described herein may modulate attributes of feedback based on the uncertainty levels associated with a recognition model's real-time outputs in a variety of ways. In some examples, the disclosed systems may modulate an attribute of feedback by setting, adjusting, tuning, or varying the attribute and/or the perceivability of the attribute to substantially reflect or otherwise convey an uncertainty level associated with a recognition model's real-time output and/or to reflect or otherwise convey changes in the uncertainty levels associated with the recognition model's real-time outputs.

In some examples, the disclosed systems may use secondary, tertiary, quaternary, or quinary feedback channels to communicate uncertainty levels. For example, in cases where a visual feedback channel is primarily used to provide feedback to a user, the disclosed systems may use an auditory feedback channel or a haptic feedback channel to communicate uncertainty levels. In some examples, the disclosed systems may select feedback that may be subtle and/or less distracting than other forms of primary feedback communicated to users via primary feedback channels.

In some examples, the disclosed systems may associate one or more types or forms of feedback with one or more types or forms of model uncertainty. For example, the disclosed systems may associate a single type or form of feedback (e.g., a single type of vibration or a form of vibration) with uncertainties related to recognized occurrences and nonoccurrences of a user behavior. In such examples, the disclosed systems may modulate one or more attributes of the feedback to convey levels of uncertainty. Alternatively, the disclosed systems may associate a first type or form of feedback with uncertainties related to recognized occurrences of the behavior and may associate a second type or form of feedback with uncertainties related to nonoccurrences of the behavior. In such examples, the disclosed systems may modulate one or more attributes of the first type of feedback to convey levels of uncertainty related to occurrences of the behavior and/or may modulate one or more attributes of the second type of feedback to convey levels of uncertainty related to nonoccurrences of the behavior.

In some examples, the disclosed systems may provide users with instructions on how to reduce uncertainties associated with the real-time outputs of a recognition model before presenting any feedback to the users. In cases where there are multiple methods by which users may reduce levels of uncertainty and/or where there are multiple causes of low uncertainty levels, the disclosed systems may associate instructions for each method with a different type of feedback such that the users may quickly know the appropriate method to apply when feedback is received.

In some examples, the disclosed systems may modulate one or more attributes of feedback to convey methods for reducing levels of uncertainty of the real-time outputs of a recognition model. For example, if a user's hand must be kept within view of a head-mounted camera system to be tracked, the disclosed systems may modulate one or more attributes of haptic feedback presented via a wrist-worn device whenever the user's hand begins to drift from view of the head-mounted camera system to remind the user to return their hand to a more ideal position for tracking. In at least one example, the disclosed systems may modulate the location of the haptic feedback to indicate the direction the user should move their hand to return it to the more ideal position for tracking.

At step 440 one or more of the systems described herein may present the feedback to the user substantially contemporaneous with the real-time output of the recognition model. For example, presenting module 110 may present feedback 206 to a user substantially contemporaneous with one of real-time output(s) 202.

The systems described herein may present feedback to a user contemporaneous with the real-time outputs of a recognition model in a variety of ways. In some examples, the disclosed systems may present the feedback to a user substantially contemporaneous with the performance of a user-input operation that is made in response to a real-time output of the recognition model. If a real-time output of the recognition model indicates that a user-input operation will not be performed, the disclosed systems may present the feedback to the user substantially contemporaneous with the determination that the real-time output indicates that the user-input operation will not be performed.

FIGS. 6-11 illustrate various exemplary ways in which the disclosed systems may modulate feedback amplitude to communicate uncertainty levels 502, which may be associated with probabilities indicative of occurrences and/or nonoccurrences of a user behavior. These examples are provided in terms of amplitude modulation and probabilities for ease of understanding. It should be noted that the disclosed systems may modulate any of the feedback attributes described above in the same or a similar manner to communicate uncertainty levels associated with any type or form of recognition-model output.

Figure 6:
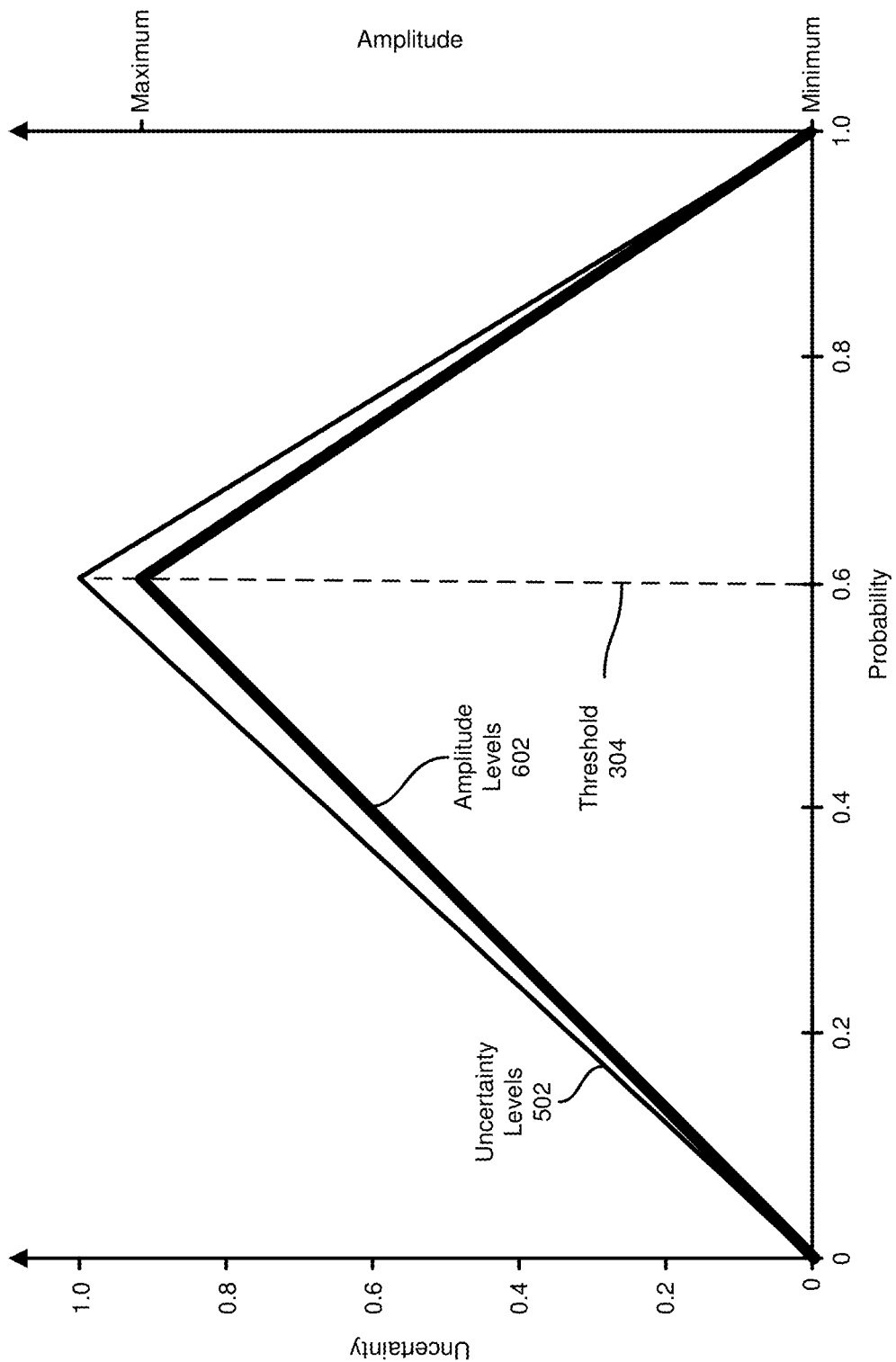
FIG. 6 is a diagram of exemplary uncertainty-modulated feedback.

FIG. 6 illustrates an exemplary proportional relationship between exemplary amplitude levels 602 and uncertainty levels 502. In this example, the disclosed systems may range from outputting low amplitude feedback in response to probabilities associated with low uncertainty levels (e.g., probabilities furthest from threshold 304) to outputting high amplitude feedback in response to probabilities associated with high uncertainty levels (e.g., probabilities closest to threshold 304). In this example, a user may receive the most noticeable feedback when the disclosed systems are encountering the most uncertain recognition-model outputs.

Figure 7:
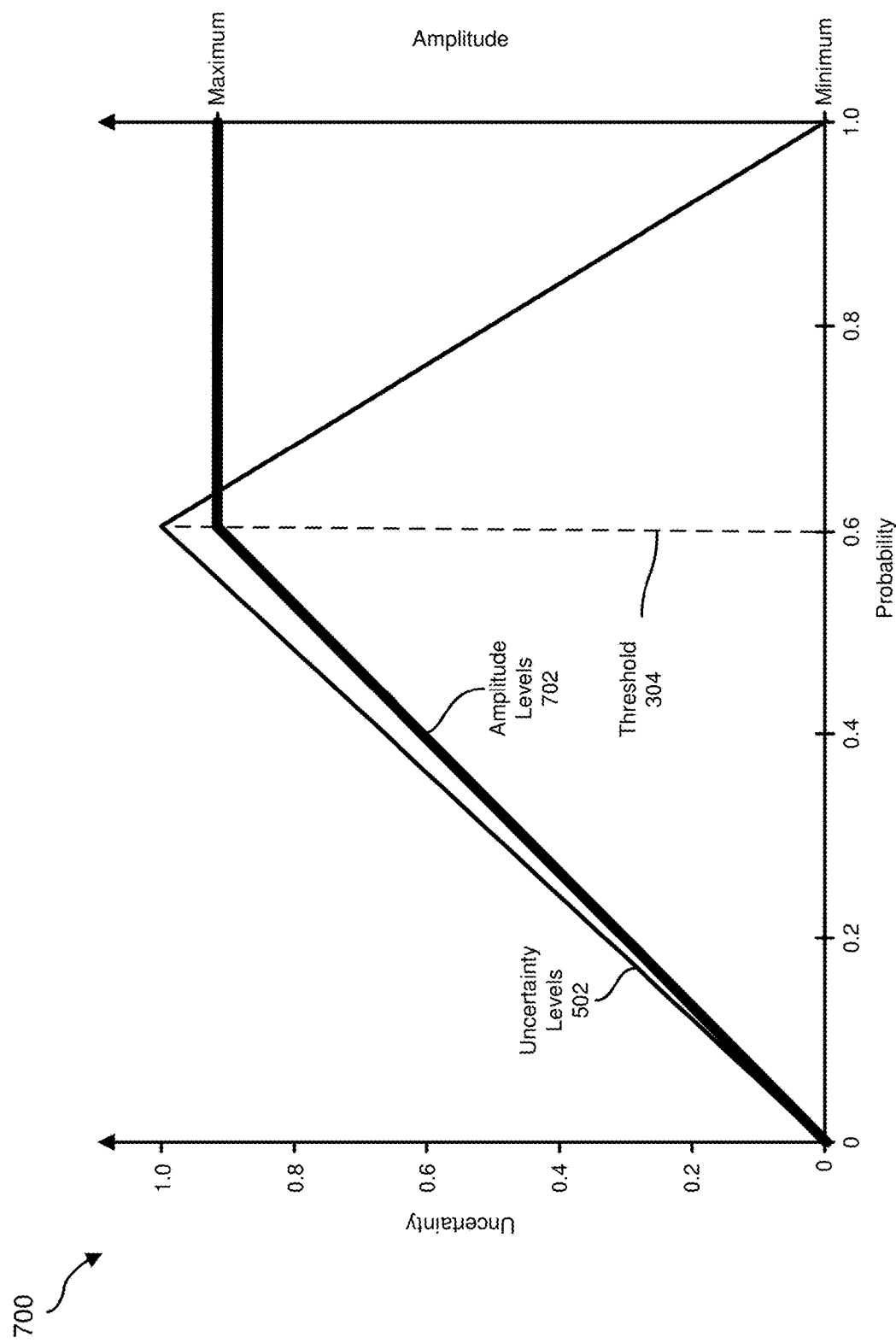
FIG. 7 is another diagram of exemplary uncertainty-modulated feedback.
Figure 8:
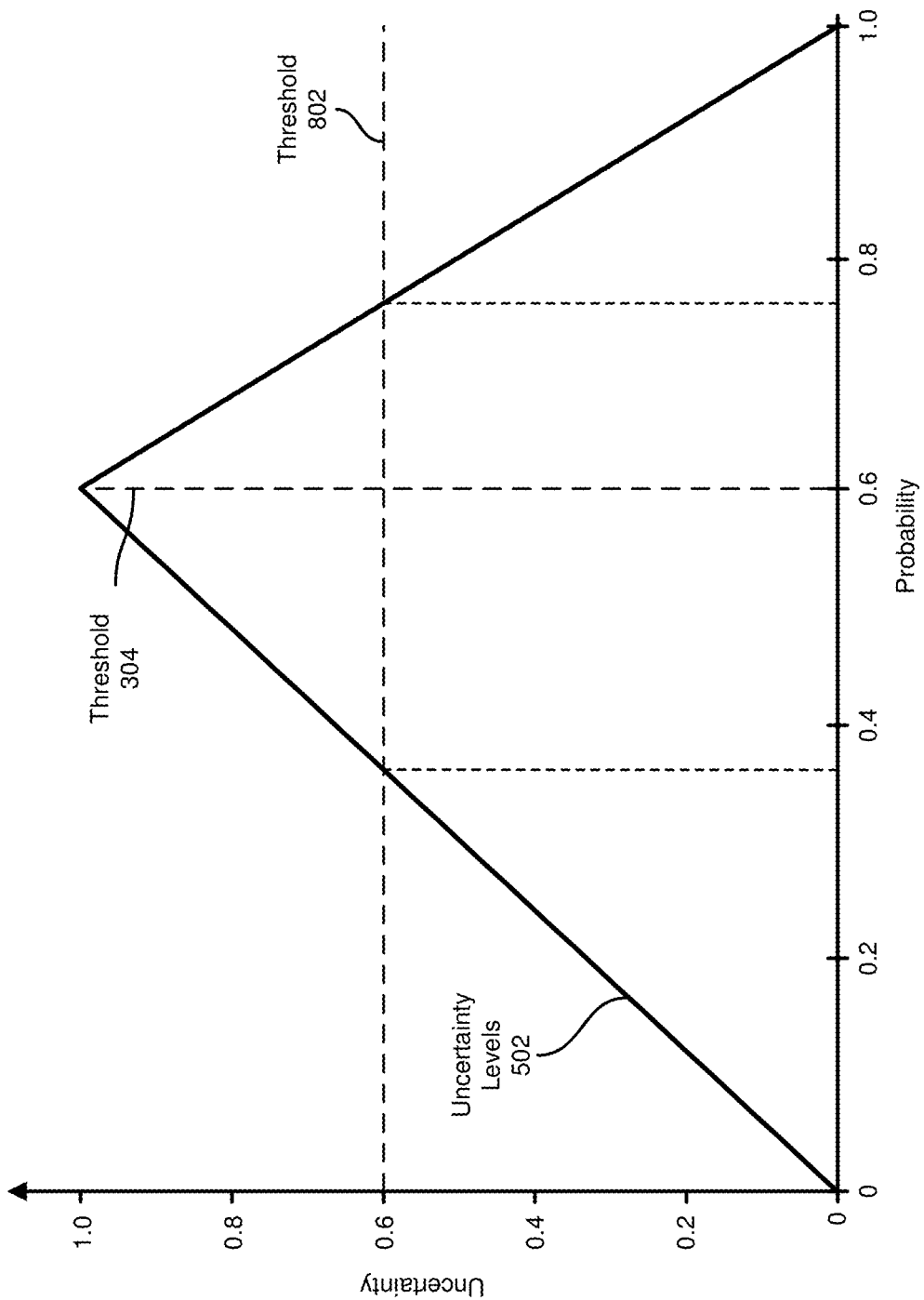
FIG. 8 is a diagram of exemplary uncertainty thresholds.

FIG. 7 illustrates an exemplary relationship between exemplary amplitude levels 702 and uncertainty levels 502. In this example, the disclosed systems may modulate amplitude levels 702 differently depending on whether probabilities will be interpreted as occurrences or nonoccurrences of a user behavior. When probabilities may be interpreted as nonoccurrences of the user behavior, the disclosed systems may range from outputting low amplitude feedback in response to probabilities associated with low uncertainty levels (e.g., probabilities furthest from threshold 304) to outputting high amplitude feedback in response to probabilities associated with high uncertainty levels (e.g., probabilities closest to threshold 304). On the other hand, when probabilities may be interpreted as occurrences of the user behavior, the disclosed systems may output high amplitude feedback regardless of the uncertainty level associated with the probabilities. In this example, a user may receive the most noticeable feedback when the user is most likely to be attempting to perform the user behavior.

Figure 9:
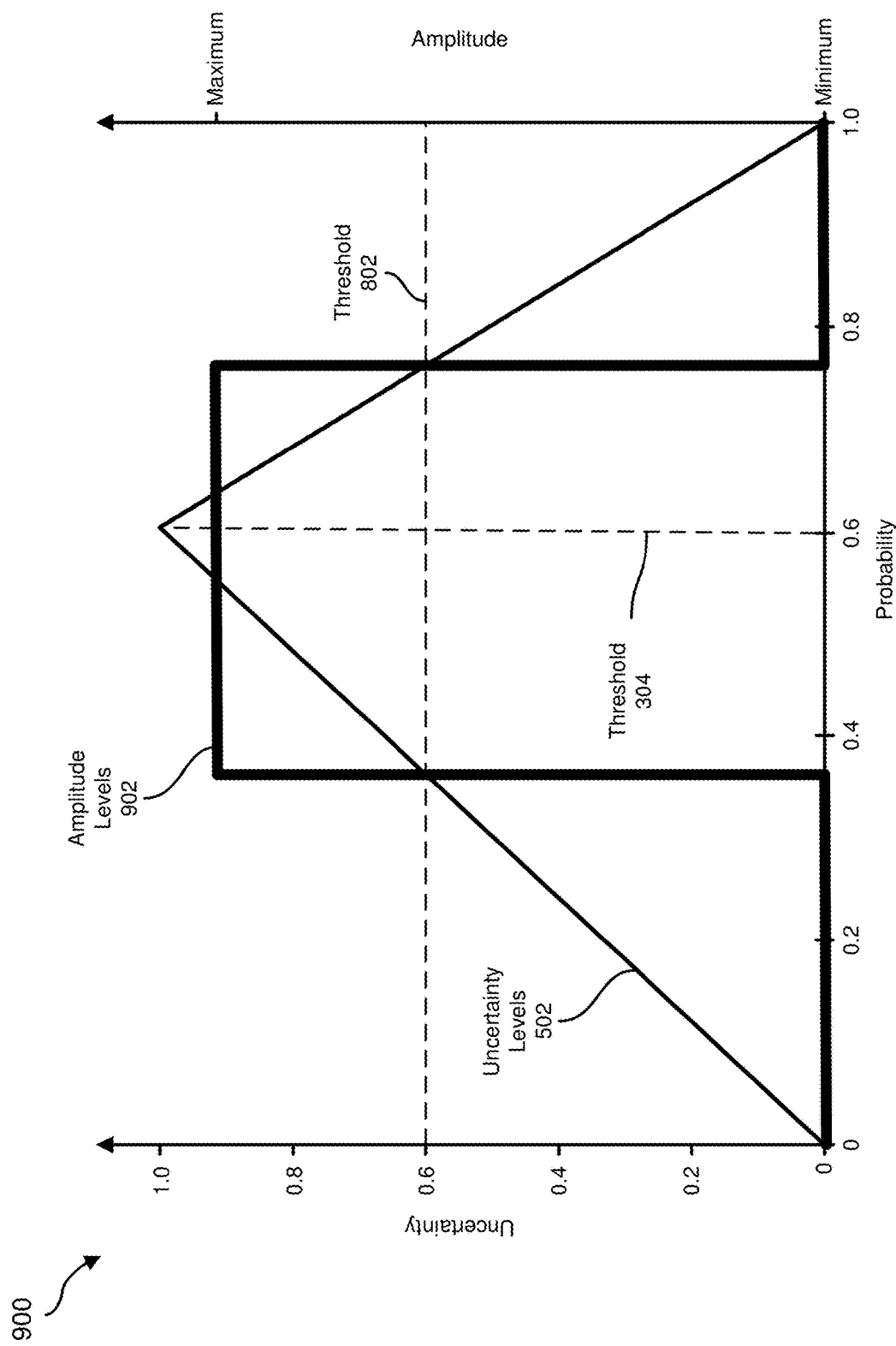
FIG. 9 is a diagram of exemplary uncertainty-based feedback.

FIGS. 8-11 illustrate various exemplary ways in which the disclosed systems may modulate feedback amplitude based on whether an encountered uncertainty level is above or below an uncertainty threshold 802. FIG. 9 illustrates an exemplary relationship between exemplary amplitude levels 902 and uncertainty levels 502. In this example, the disclosed systems may modulate amplitude levels 902 differently depending on whether probabilities are associated with uncertainty levels above or below threshold 802. When an encountered probability is associated with an uncertainty level below threshold 802, the disclosed systems may output no feedback. On the other hand, when an encountered probability is associated with an uncertainty level above threshold 802, the disclosed systems may output high amplitude feedback regardless of the uncertainty level associated with the probability. In this example, a user may receive noticeable feedback when the disclosed systems are encountering the most uncertain recognition-model outputs.

Figure 10:
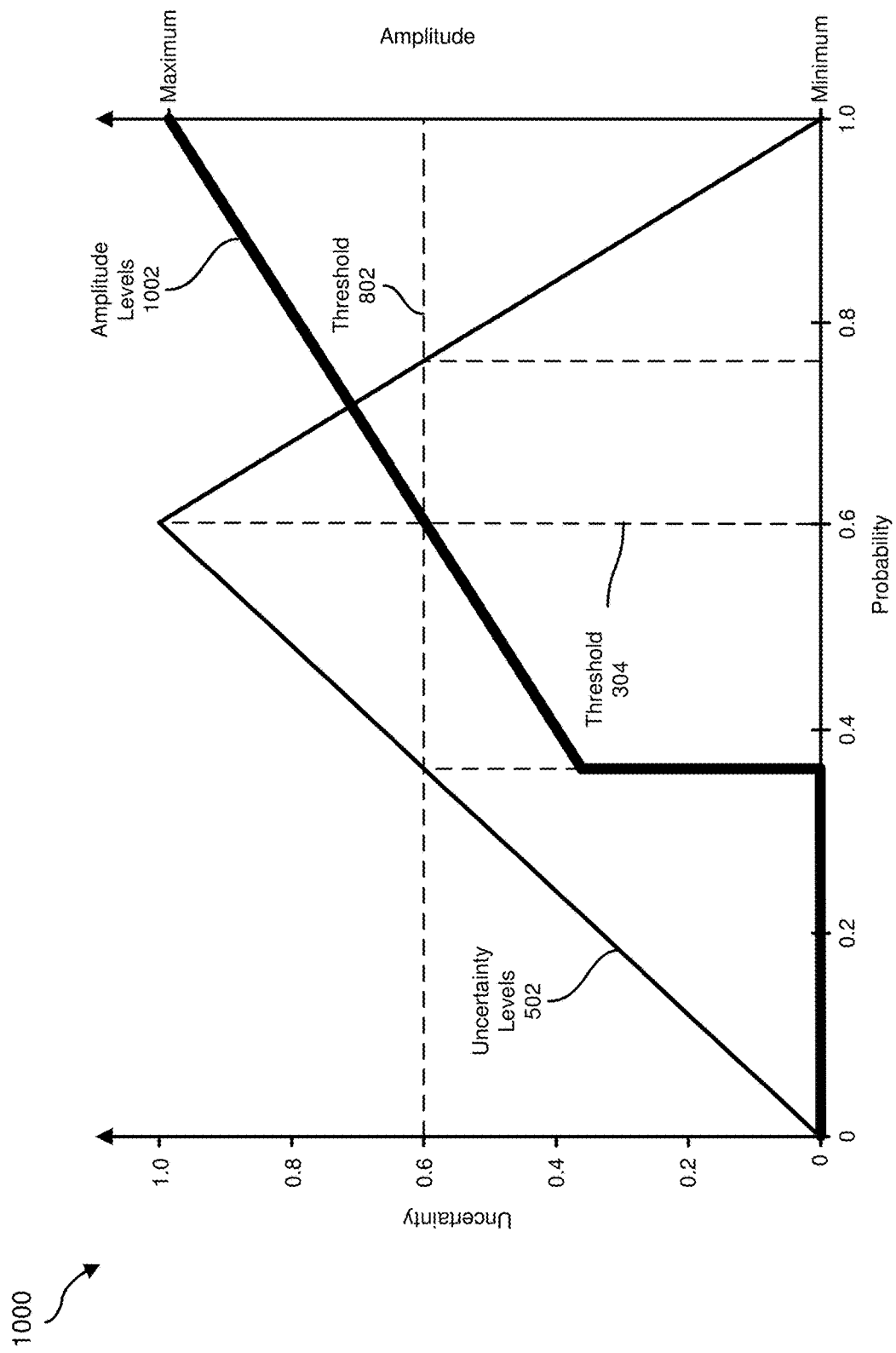
FIG. 10 is another diagram of exemplary uncertainty-based feedback.

FIG. 10 illustrates an exemplary relationship between exemplary amplitude levels 1002 and uncertainty levels 502. In this example, the disclosed systems may modulate amplitude levels 1002 differently depending on whether probabilities are above threshold 304 and/or whether the probabilities are associated with uncertainty levels above or below threshold 802. When an encountered probability is below threshold 304 and associated with an uncertainty level below threshold 802, the disclosed systems may output no feedback. On the other hand, when encountering probabilities above threshold 304 or when encountering probabilities associated with an uncertainty level above threshold 802, the disclosed systems may range from outputting lower amplitude feedback in response to lower probabilities to outputting higher amplitude feedback in response to higher probabilities. In this example, a user may receive the most noticeable feedback when the user is most likely to be attempting to perform the user behavior.

Figure 11:
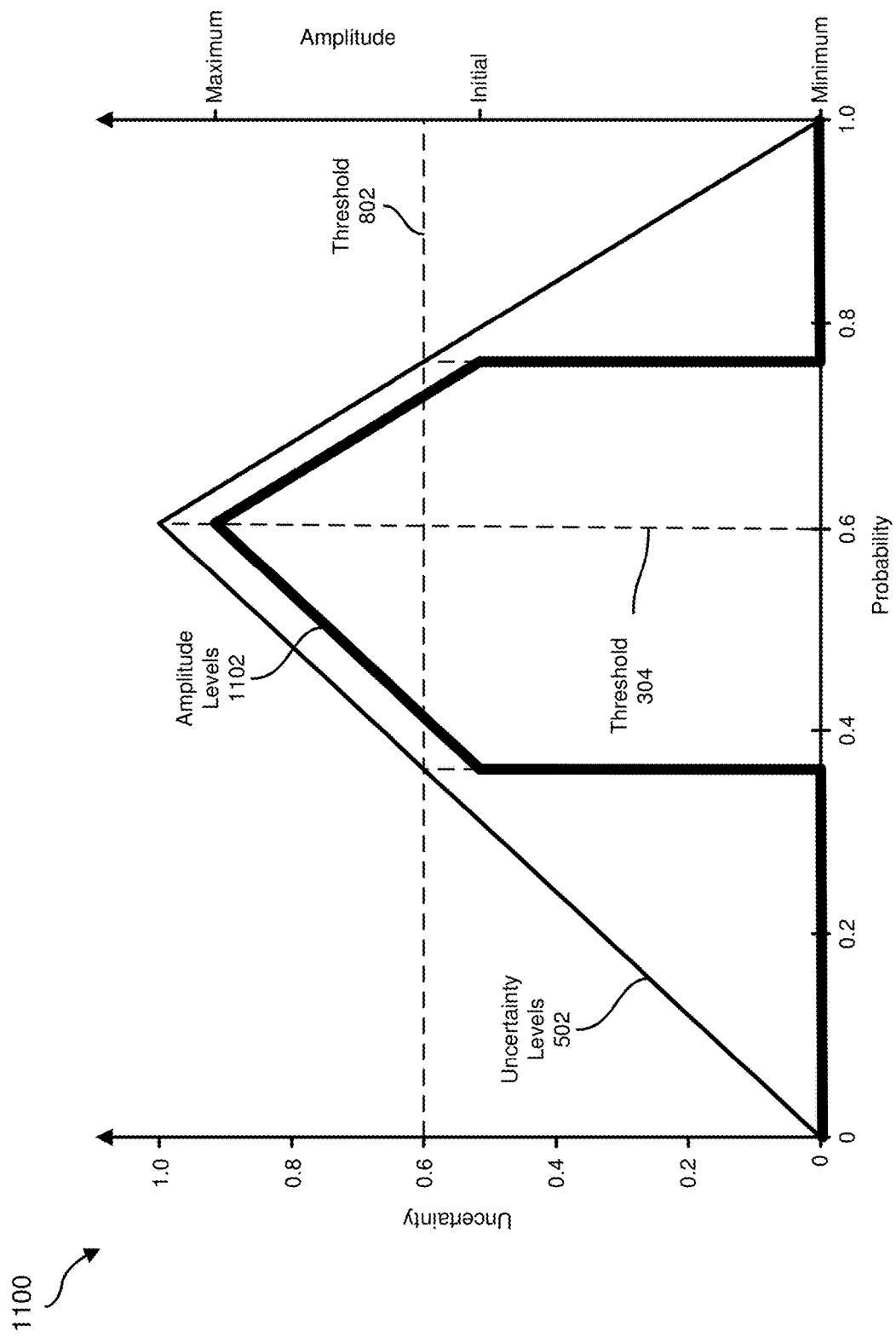
FIG. 11 is another diagram of exemplary uncertainty-based feedback.

FIG. 11 illustrates an exemplary proportional relationship between exemplary amplitude levels 1102 and uncertainty levels 502. In this example, the disclosed systems may modulate amplitude levels 1102 differently depending on whether probabilities are associated with uncertainty levels above or below threshold 802. When an encountered probability is associated with an uncertainty level below threshold 802, the disclosed systems may output no feedback. On the other hand, when an encountered probability is associated with an uncertainty level above threshold 802, the disclosed systems may range from outputting low amplitude feedback in response to probabilities associated with low uncertainty levels (e.g., probabilities furthest from threshold 304) to outputting high amplitude feedback in response to probabilities associated with high uncertainty levels (e.g., probabilities closest to threshold 304). In this example, a user may receive the most noticeable feedback when the disclosed systems are encountering the most uncertain recognition-model outputs but may not be bothered with feedback when the disclosed systems are encountering the most certain recognition-model outputs.

Figure 12:
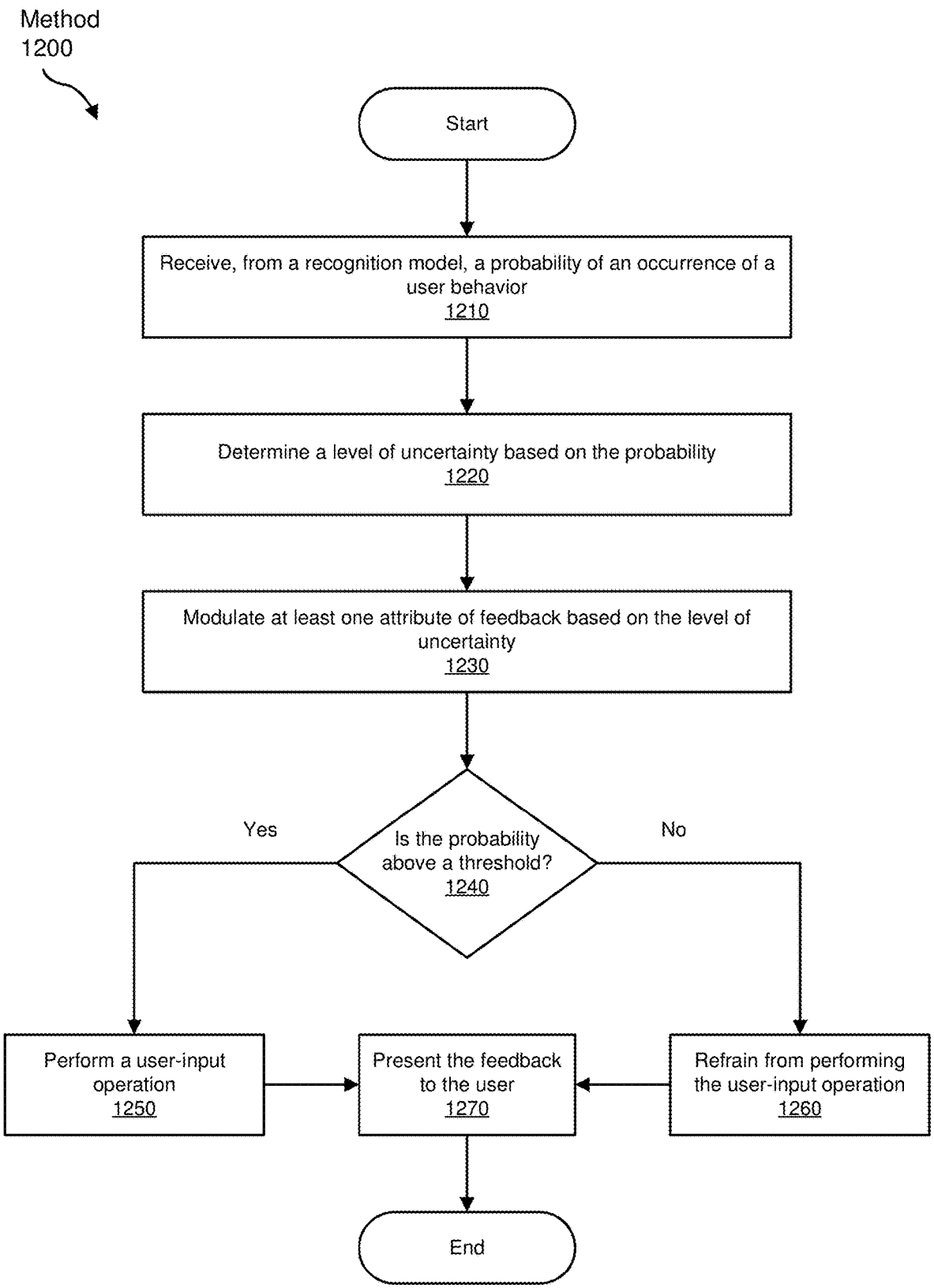
FIG. 12 is a flow diagram of another exemplary method for communicating model uncertainty to users.

FIG. 12 is a flow diagram of an exemplary computer-implemented method 1200 for communicating probability-based uncertainty levels to users contemporaneous with reacting to user behaviors. The steps shown in FIG. 12 may be performed by any suitable computer-executable code and/or computing system, including the system(s) illustrated in FIG. 1. In one example, each of the steps shown in FIG. 12 may represent an algorithm whose structure includes and/or is represented by multiple sub-steps, examples of which will be provided in greater detail below. Some of the steps shown in FIG. 12 are similar to the steps shown in FIG. 4, therefore, the discussion of the steps shown in FIG. 4 may also apply to the steps shown in FIG. 12.

As illustrated in FIG. 12, at step 1210 one or more of the systems described herein may receive, from a recognition model, a probability of an occurrence of a user behavior. For example, receiving module 104 may receive one of probabilities 306-312 illustrated in FIG. 3. At step 1220 one or more of the systems described herein may next determine a level of uncertainty based on the probability received at step 1210. In one example, determining module 106 may determine an uncertainty level of the probability received at step 1210 using Equation (1) as described above. For example, determining module 106 may determine relatively lower uncertainty levels for probabilities 306 and 308 and/or relatively higher uncertainty levels for probabilities 310 and 312.

At step 1230 one or more of the systems described herein may then modulate at least one attribute of feedback based on the level of uncertainty determined at step 1220. For example, modulating module 108 may modulate at least one attribute of haptic feedback to convey the level of uncertainty determined at step 1220 (e.g., lower amplitude vibrations may convey the relatively lower uncertainty levels of probabilities 306 and 308 or higher amplitude vibrations may convey the relatively higher uncertainty levels of probabilities 310 and 312). At step 1240 one or more of the systems described herein may determine if a probability received at step 1210 is above a predetermined threshold. For example, determining module 106 may determine if a probability received at step 1210 is above or below threshold 304. If a probability received at step 1210 is determined to be above the threshold (e.g., as may occur with probabilities 306 and 310), execution of method 1200 may continue at step 1250 where the disclosed systems may react as if the behavior was detected by performing a user-input operation associated with the behavior. On the other hand, if the probability received at step 1210 is determined to be below the threshold (e.g., as may occur with probabilities 308 and 312), execution of method 1200 may continue at step 1260 where the disclosed systems may react as if the associated behavior was not detected by refraining from performing the user-input operation associated with the behavior. Finally, at step 1270 one or more of the systems described herein may present the feedback modulated at step 1230 to the user substantially contemporaneous with the performance of step 1250 or step 1260.

As described above, the disclosed systems may use modulated haptics and/or other forms of user feedback to convey the possibly varying uncertainty levels of predictive models, especially models that predict user position, controller position, and/or user input. In some examples, a pinch detection model may output a value indicating the probability that a user is performing a pinch gesture. The disclosed systems may react as if the user is performing the pinch gesture when an outputted probability is within an upper range and/or may react as if the user is not performing the pinch gesture when an outputted probability is within a lower range. When an outputted probability is within an intermediate range, the disclosed systems may be less certain or uncertain of whether the user is performing the pinch gesture. In at least these uncertain cases, the disclose systems may present haptic feedback to the user that has been modulated to indicate the system's uncertainty/level of uncertainty. In another example, a hand tracking model may estimate the position of a user's hand and may output a value indicating the certainty or uncertainty of any estimated hand positions.

As the user moves their hand, the disclosed systems may communicate the certainty or uncertainty of the estimated hand positions to the user via modulated haptic feedback. As explained above, by providing transparency with regards to model uncertainty, the disclosed systems may reduce user frustration and/or may cause users to adapt their behaviors in ways that lead to improved model predictions and user experiences.

EXAMPLE EMBODIMENTS

Example 1: A computer-implemented method for communicating model uncertainty may include (1) receiving information associated with a real-time output of a recognition model adapted to recognize at least one behavior of a user, (2) determining, based on the information, a level of uncertainty associated with the real-time output, (3) modulating at least one attribute of feedback based on the level of uncertainty, and (4) presenting the feedback to the user substantially contemporaneous with the real-time output of the recognition model.

Example 2: The computer-implemented method of Example 1 where (1) the information associated with the real-time output of the recognition model includes a probability of the user performing the behavior, (2) the computer-implemented method further includes at least one of (a) performing a user-input operation when the probability of the user performing the behavior is above a predetermined threshold and/or (b) refraining from performing the user-input operation when the probability of the user performing the behavior is below the predetermined threshold, and (3) the level of uncertainty associated with the real-time output may be determined based on a distance between the probability and the predetermined threshold. In some examples, the level of uncertainty may be inversely proportional to the distance.

Example 3: The computer-implemented method of any of Examples 1-2 where (1) the information associated with the real-time output of the recognition model includes a probability of the user performing the behavior and (2) the attribute of the feedback may be modulated to have a level of perceivability proportional to the probability of the user performing the behavior.

Example 4: The computer-implemented method of any of Examples 1-3 where the attribute of the feedback may be modulated to have a level of perceivability proportional to the level of uncertainty associated with the real-time output.

Example 5: The computer-implemented method of any of Examples 1-4 where (1) the recognition model includes a pinch recognition model adapted to output probabilities of the user performing a pinch gesture, (2) the information includes a probability of the user performing the pinch gesture, (3) the computer-implemented method further includes performing a user-input operation when the probability of the user performing the pinch gesture is above a predetermined threshold, and (4) the feedback may be presented to the user contemporaneous with performing the user-input operation when the probability of the user performing the pinch gesture is above the predetermined threshold.

Example 6: The computer-implemented method of any of Examples 1-5 where (1) the recognition model includes a pinch recognition model adapted to output probabilities of the user performing a pinch gesture, (2) the information includes a probability of the user performing the pinch gesture, (3) the computer-implemented method further includes refraining from performing a user-input operation when the probability of the user performing the pinch gesture is below a predetermined threshold, and (4) the feedback may be presented to the user contemporaneous with determining that the probability of the user performing the pinch gesture is below the predetermined threshold.

Example 7: The computer-implemented method of any of Examples 1-6 where (1) the recognition model may include a hand-tracking model adapted to output (a) position or orientation information for one or more portions of the user's hand and (b) a confidence level of the position or orientation information and (2) the level of uncertainty associated with the real-time output may be determined based on the confidence level. In some examples, the level of uncertainty may be inversely proportional to the confidence level.

Example 8: The computer-implemented method of any of Examples 1-7 where (1) the feedback may be haptic feedback and (2) at least one attribute of the haptic feedback may be based on the level of uncertainty associated with the real-time output.

Example 9: The computer-implemented method of any of Examples 1-8 where (1) the feedback may be a vibration and (2) at least one attribute of the vibration may be based on the level of uncertainty associated with the real-time output.

Example 10: The computer-implemented method of any of Examples 1-9 where modulating the attribute of the feedback based on the level of uncertainty includes modulating one or more of (1) an amplitude of the feedback to convey the level of uncertainty to the user, (2) a frequency of the feedback to convey the level of uncertainty to the user, (3) a duration of the feedback to convey the level of uncertainty to the user, (4) a pattern of the feedback to convey the level of uncertainty to the user, and/or (5) a spatialization of the feedback to convey the level of uncertainty to the user.

Example 11: The computer-implemented method of any of Examples 1-10 where the feedback indicates a method for reducing the level of uncertainty of the real-time output.

Example 12: The computer-implemented method of any of Examples 1-11 further including (1) receiving additional information associated with an additional real-time output of the recognition model, (2) determining, based on the additional information, an additional level of uncertainty associated with the additional real-time output, and (3) modulating the feedback being presented to the user based on the additional level of uncertainty.

Example 13: A system may include (1) at least one physical processor and (2) physical memory including computer-executable instructions that, when executed by the physical processor, cause the physical processor to (a) receive information associated with a real-time output of a recognition model adapted to recognize at least one behavior of a user, (b) determine, based on the information, a level of uncertainty associated with the real-time output, (c) modulate at least one attribute of feedback based on the level of uncertainty, and (d) present the feedback to the user substantially contemporaneous with the real-time output of the recognition model.

Example 14: The system of Example 13 where (1) the information associated with the real-time output of the recognition model includes a probability of the user performing the behavior, (2) the computer-executable instructions, when executed by the physical processor, further cause the physical processor to (a) perform a user-input operation when the probability of the user performing the behavior is above a predetermined threshold and/or (b) refrain from performing the user-input operation when the probability of the user performing the behavior is below the predetermined threshold, and (3) the level of uncertainty associated with the real-time output may be determined based on a distance between the probability and the predetermined threshold. In some examples, the level of uncertainty may be inversely proportional to the distance.

Example 15: The system of any of Examples 13-14 where (1) the information associated with the real-time output of the recognition model includes a probability of the user performing the behavior and (2) the attribute of the feedback may be modulated to have a level of perceivability proportional to the probability of the user performing the behavior.

Example 16: The system of any of Examples 13-15 where the attribute of the feedback may be modulated to have a level of perceivability proportional to the level of uncertainty associated with the real-time output.

Example 17: The system of any of Examples 13-16 where (1) the recognition model includes a pinch recognition model adapted to output probabilities of the user performing a pinch gesture, (2) the information includes a probability of the user performing the pinch gesture, (3) the computer-executable instructions, when executed by the physical processor, further cause the physical processor to perform a user-input operation when the probability of the user performing the pinch gesture is above a predetermined threshold, and (4) the feedback may be presented to the user contemporaneous with performing the user-input operation when the probability of the user performing the pinch gesture is above the predetermined threshold.

Example 18: The system of any of Examples 13-17 where (1) the recognition model includes a pinch recognition model adapted to output probabilities of the user performing a pinch gesture, (2) the information includes a probability of the user performing the pinch gesture, (3) the computer-executable instructions, when executed by the physical processor, further cause the physical processor to refrain from performing a user-input operation when the probability of the user performing the pinch gesture is below a predetermined threshold, and (4) the feedback may be presented to the user contemporaneous with determining that the probability of the user performing the pinch gesture is below the predetermined threshold.

Example 19: The system of any of Examples 13-18 where (1) the recognition model may include a hand-tracking model adapted to output (a) position or orientation information for one or more portions of the user's hand and (b) a confidence level of the position or orientation information and (2) the level of uncertainty associated with the real-time output may be determined based on the confidence level. In some examples, the level of uncertainty may be inversely proportional to the confidence level.

Example 20: A non-transitory computer-readable medium may include one or more computer-executable instructions that, when executed by at least one processor of a computing device, cause the computing device to (1) receive information associated with a real-time output of a recognition model adapted to recognize at least one behavior of a user, (2) determine, based on the information, a level of uncertainty associated with the real-time output, (3) modulate at least one attribute of feedback based on the level of uncertainty, and (4) present the feedback to the user substantially contemporaneous with the real-time output of the recognition model.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 13) or that visually immerses a user in an artificial reality (such as, e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 13:
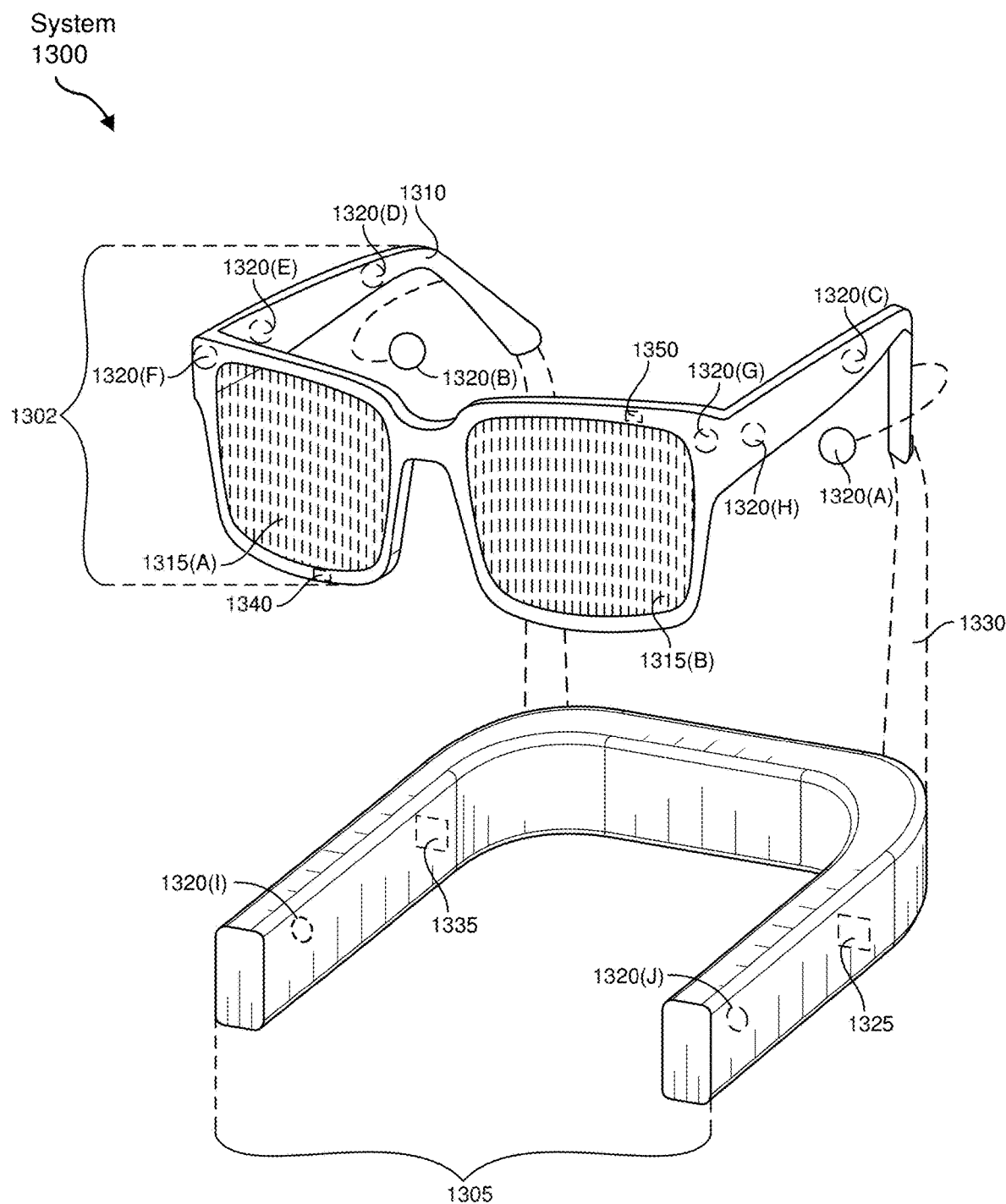
FIG. 13 is an illustration of exemplary augmented-reality glasses that may be used in connection with embodiments of this disclosure.

Turning to FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

In some examples, augmented-reality system 1300 may also include a microphone array with a plurality of acoustic transducers 1320(A)-1320(J), referred to collectively as acoustic transducers 1320. Acoustic transducers 1320 may represent transducers that detect air pressure variations induced by sound waves. Each acoustic transducer 1320 may be configured to detect sound and convert the detected sound into an electronic format (e.g., an analog or digital format). The microphone array in FIG. 13 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(I) and 1320(J), which may be positioned on a corresponding neckband 1305.

In some embodiments, one or more of acoustic transducers 1320(A)-(J) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality device 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a BLUETOOTH connection). In still other embodiments, acoustic transducers 1320(A) and 1320(B) may not be used at all in conjunction with augmented-reality system 1300.

Acoustic transducers 1320 on frame 1310 may be positioned in a variety of different ways, including along the length of the temples, across the bridge, above or below display devices 1315(A) and 1315(B), or some combination thereof. Acoustic transducers 1320 may also be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(I) and 1320(J)) that are part of the microphone array (or potentially form their own microphone subarray). Neckband 1305 may also include a controller 1325 and a power source 1335.

Acoustic transducers 1320(I) and 1320(J) of neckband 1305 may be configured to detect sound and convert the detected sound into an electronic format (analog or digital). In the embodiment of FIG. 13, acoustic transducers 1320(I) and 1320(J) may be positioned on neckband 1305, thereby increasing the distance between the neckband acoustic transducers 1320(I) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1300 and/or virtual-reality system 1400 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, BLUETOOTH, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1300 and 1400 of FIGS. 13 and 14, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

As noted, artificial-reality systems 1300 and 1400 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 15:
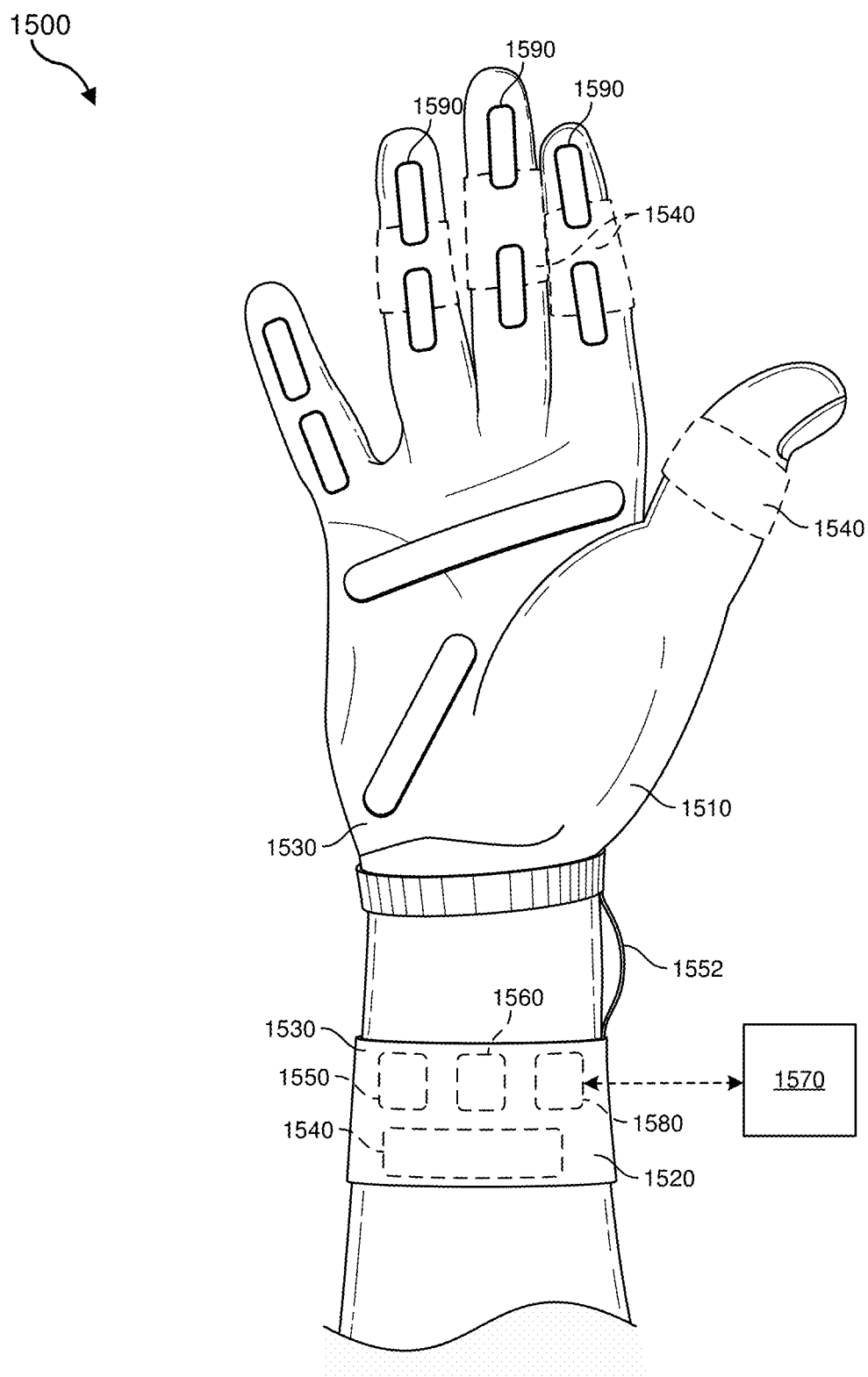
FIG. 15 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 15 illustrates a vibrotactile system 1500 in the form of a wearable glove (haptic device 1510) and wristband (haptic device 1520). Haptic device 1510 and haptic device 1520 are shown as examples of wearable devices that include a flexible, wearable textile material 1530 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1540 may be positioned at least partially within one or more corresponding pockets formed in textile material 1530 of vibrotactile system 1500. Vibrotactile devices 1540 may be positioned in locations to provide a vibrating sensation (e.g., haptic feedback) to a user of vibrotactile system 1500. For example, vibrotactile devices 1540 may be positioned against the user's finger(s), thumb, or wrist, as shown in FIG. 15. Vibrotactile devices 1540 may, in some examples, be sufficiently flexible to conform to or bend with the user's corresponding body part(s).

A power source 1550 (e.g., a battery) for applying a voltage to the vibrotactile devices 1540 for activation thereof may be electrically coupled to vibrotactile devices 1540, such as via conductive wiring 1552. In some examples, each of vibrotactile devices 1540 may be independently electrically coupled to power source 1550 for individual activation. In some embodiments, a processor 1560 may be operatively coupled to power source 1550 and configured (e.g., programmed) to control activation of vibrotactile devices 1540.

Vibrotactile system 1500 may be implemented in a variety of ways. In some examples, vibrotactile system 1500 may be a standalone system with integral subsystems and components for operation independent of other devices and systems. As another example, vibrotactile system 1500 may be configured for interaction with another device or system 1570. For example, vibrotactile system 1500 may, in some examples, include a communications interface 1580 for receiving and/or sending signals to the other device or system 1570. The other device or system 1570 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1580 may enable communications between vibrotactile system 1500 and the other device or system 1570 via a wireless (e.g., Wi-Fi, BLUETOOTH, cellular, radio, etc.) link or a wired link. If present, communications interface 1580 may be in communication with processor 1560, such as to provide a signal to processor 1560 to activate or deactivate one or more of the vibrotactile devices 1540.

Vibrotactile system 1500 may optionally include other subsystems and components, such as touch-sensitive pads 1590, pressure sensors, motion sensors, position sensors, lighting elements, and/or user interface elements (e.g., an on/off button, a vibration control element, etc.). During use, vibrotactile devices 1540 may be configured to be activated for a variety of different reasons, such as in response to the user's interaction with user interface elements, a signal from the motion or position sensors, a signal from the touch-sensitive pads 1590, a signal from the pressure sensors, a signal from the other device or system 1570, etc.

Although power source 1550, processor 1560, and communications interface 1580 are illustrated in FIG. 15 as being positioned in haptic device 1520, the present disclosure is not so limited. For example, one or more of power source 1550, processor 1560, or communications interface 1580 may be positioned within haptic device 1510 or within another wearable textile.

Figure 16:
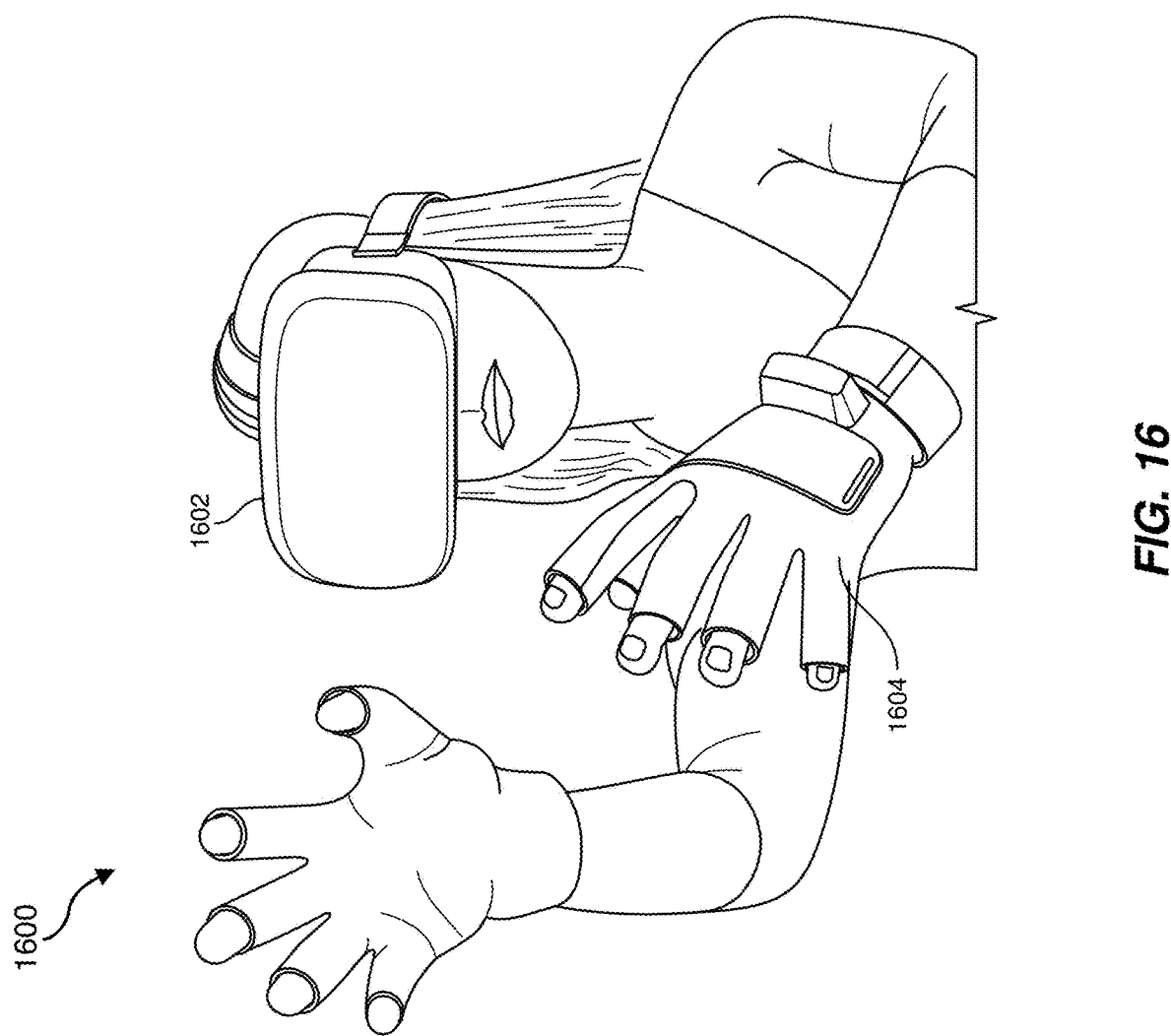
FIG. 16 is an illustration of an exemplary virtual-reality environment according to embodiments of this disclosure.

Haptic wearables, such as those shown in and described in connection with FIG. 15, may be implemented in a variety of types of artificial-reality systems and environments. FIG. 16 shows an example artificial-reality environment 1600 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 14:
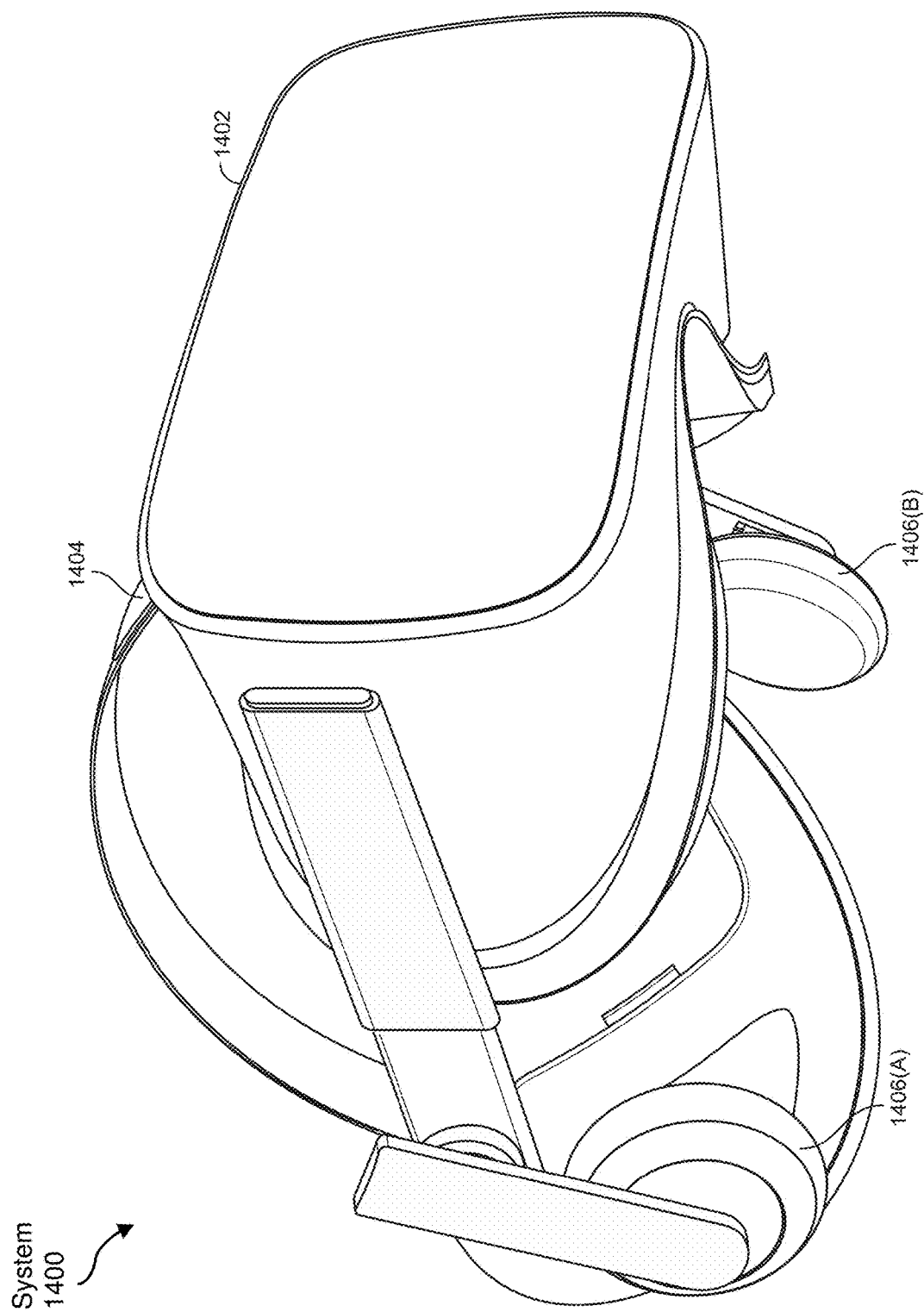
FIG. 14 is an illustration of an exemplary virtual-reality headset that may be used in connection with embodiments of this disclosure.

Head-mounted display 1602 generally represents any type or form of virtual-reality system, such as virtual-reality system 1400 in FIG. 14. Haptic device 1604 generally represents any type or form of wearable device, worn by a user of an artificial-reality system, that provides haptic feedback to the user to give the user the perception that he or she is physically engaging with a virtual object. In some embodiments, haptic device 1604 may provide haptic feedback by applying vibration, motion, and/or force to the user. For example, haptic device 1604 may limit or augment a user's movement. To give a specific example, haptic device 1604 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1604 to send action requests to a console. Examples of action requests include, without limitation, requests to start an application and/or end the application and/or requests to perform a particular action within the application.

Figure 17:
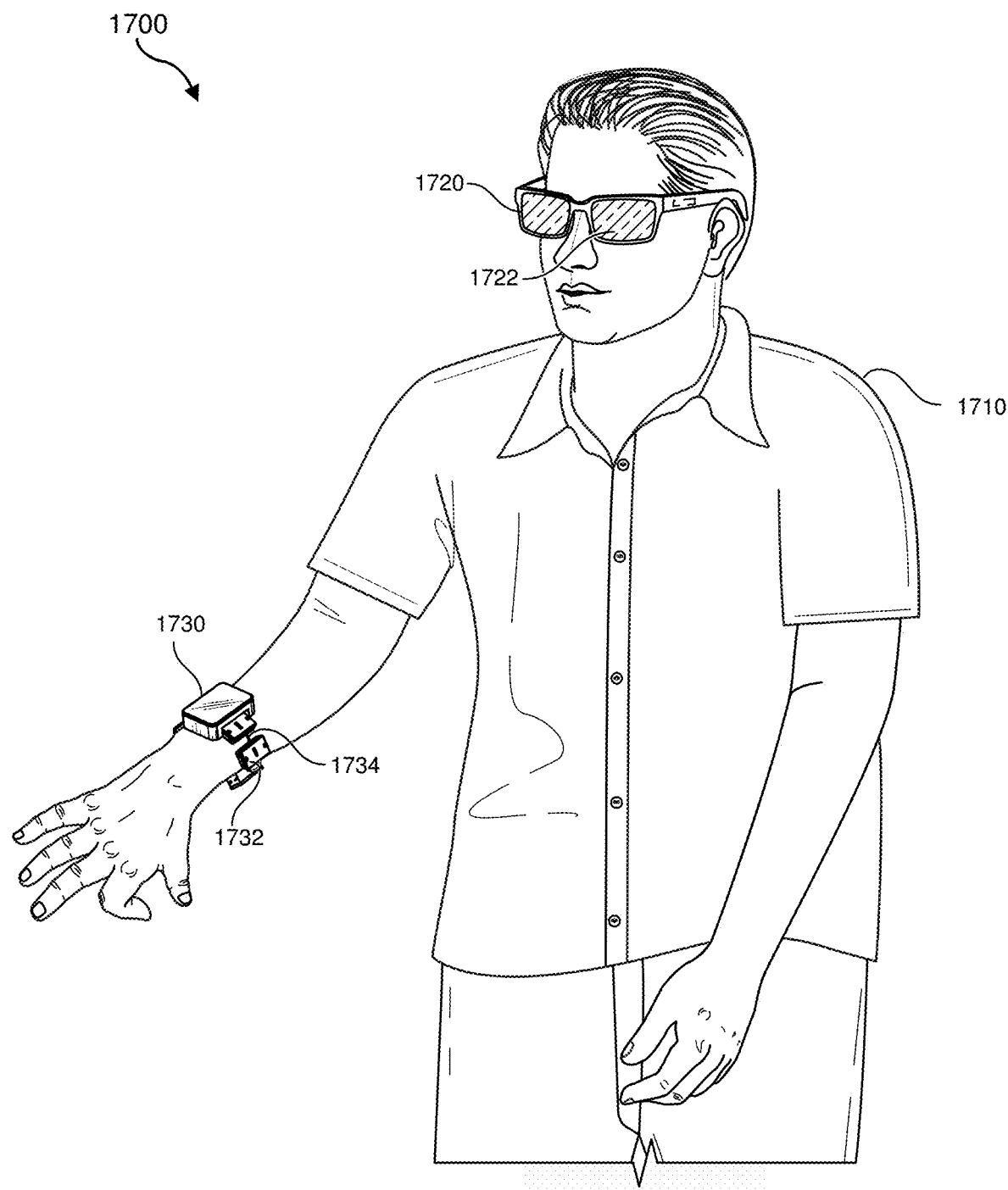
FIG. 17 is an illustration of an exemplary augmented-reality environment according to embodiments of this disclosure.

While haptic interfaces may be used with virtual-reality systems, as shown in FIG. 16, haptic interfaces may also be used with augmented-reality systems, as shown in FIG. 17. FIG. 17 is a perspective view of a user 1710 interacting with an augmented-reality system 1700. In this example, user 1710 may wear a pair of augmented-reality glasses 1720 that may have one or more displays 1722 and that are paired with a haptic device 1730. In this example, haptic device 1730 may be a wristband that includes a plurality of band elements 1732 and a tensioning mechanism 1734 that connects band elements 1732 to one another.

One or more of band elements 1732 may include any type or form of actuator suitable for providing haptic feedback. For example, one or more of band elements 1732 may be configured to provide one or more of various types of cutaneous feedback, including vibration, force, traction, texture, and/or temperature. To provide such feedback, band elements 1732 may include one or more of various types of actuators. In one example, each of band elements 1732 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1510, 1520, 1604, and 1730 may include any suitable number and/or type of haptic transducer, sensor, and/or feedback mechanism. For example, haptic devices 1510, 1520, 1604, and 1730 may include one or more mechanical transducers, piezoelectric transducers, and/or fluidic transducers. Haptic devices 1510, 1520, 1604, and 1730 may also include various combinations of different types and forms of transducers that work together or independently to enhance a user's artificial-reality experience. In one example, each of band elements 1732 of haptic device 1730 may include a vibrotactor (e.g., a vibrotactile actuator) configured to vibrate in unison or independently to provide one or more of various types of haptic sensations to a user.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 18:
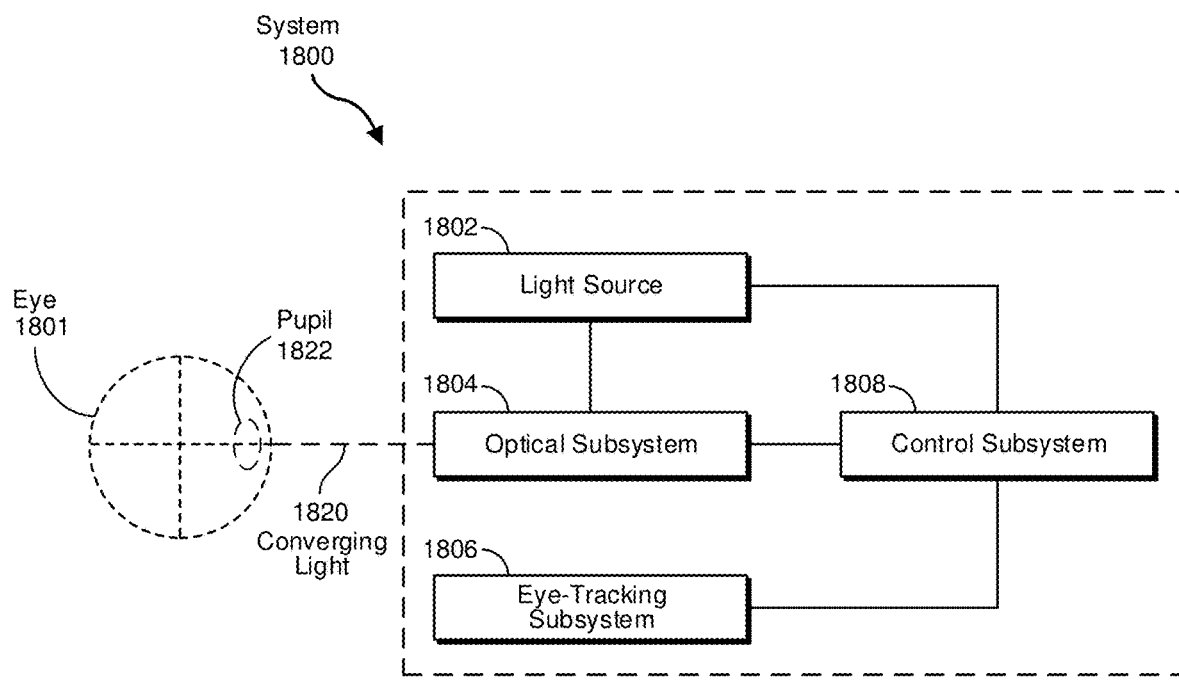
FIG. 18 an illustration of an exemplary system that incorporates an eye-tracking subsystem capable of tracking a user's eye(s).

FIG. 18 is an illustration of an exemplary system 1800 that incorporates an eye-tracking subsystem capable of tracking a user's eye(s). As depicted in FIG. 18, system 1800 may include a light source 1802, an optical subsystem 1804, an eye-tracking subsystem 1806, and/or a control subsystem 1808. In some examples, light source 1802 may generate light for an image (e.g., to be presented to an eye 1801 of the viewer). Light source 1802 may represent any of a variety of suitable devices. For example, light source 1802 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1804 may receive the light generated by light source 1802 and generate, based on the received light, converging light 1820 that includes the image. In some examples, optical subsystem 1804 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1820. Further, various mechanical couplings may serve to maintain the relative spacing and/or the orientation of the optical components in any suitable combination.

In one embodiment, eye-tracking subsystem 1806 may generate tracking information indicating a gaze angle of an eye 1801 of the viewer. In this embodiment, control subsystem 1808 may control aspects of optical subsystem 1804 (e.g., the angle of incidence of converging light 1820) based at least in part on this tracking information. Additionally, in some examples, control subsystem 1808 may store and utilize historical tracking information (e.g., a history of the tracking information over a given duration, such as the previous second or fraction thereof) to anticipate the gaze angle of eye 1801 (e.g., an angle between the visual axis and the anatomical axis of eye 1801). In some embodiments, eye-tracking subsystem 1806 may detect radiation emanating from some portion of eye 1801 (e.g., the cornea, the iris, the pupil, or the like) to determine the current gaze angle of eye 1801. In other examples, eye-tracking subsystem 1806 may employ a wavefront sensor to track the current location of the pupil.

Any number of techniques can be used to track eye 1801. Some techniques may involve illuminating eye 1801 with infrared light and measuring reflections with at least one optical sensor that is tuned to be sensitive to the infrared light. Information about how the infrared light is reflected from eye 1801 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1806 may be digitized (i.e., converted to an electronic signal). Further, the sensor may transmit a digital representation of this electronic signal to one or more processors (for example, processors associated with a device including eye-tracking subsystem 1806). Eye-tracking subsystem 1806 may include any of a variety of sensors in a variety of different configurations. For example, eye-tracking subsystem 1806 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1806 to track the movement of eye 1801. In another example, these processors may track the movements of eye 1801 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1806 may be programmed to use an output of the sensor(s) to track movement of eye 1801. In some embodiments, eye-tracking subsystem 1806 may analyze the digital representation generated by the sensors to extract eye rotation information from changes in reflections. In one embodiment, eye-tracking subsystem 1806 may use corneal reflections or glints (also known as Purkinje images) and/or the center of the eye's pupil 1822 as features to track over time.

In some embodiments, eye-tracking subsystem 1806 may use the center of the eye's pupil 1822 and infrared or near-infrared, non-collimated light to create corneal reflections. In these embodiments, eye-tracking subsystem 1806 may use the vector between the center of the eye's pupil 1822 and the corneal reflections to compute the gaze direction of eye 1801. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1806 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1801 may act as a retroreflector as the light reflects off the retina, thereby creating a bright pupil effect similar to a red-eye effect in photography. If the illumination source is offset from the optical path, then the eye's pupil 1822 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1808 may control light source 1802 and/or optical subsystem 1804 to reduce optical aberrations (e.g., chromatic aberrations and/or monochromatic aberrations) of the image that may be caused by or influenced by eye 1801. In some examples, as mentioned above, control subsystem 1808 may use the tracking information from eye-tracking subsystem 1806 to perform such control. For example, in controlling light source 1802, control subsystem 1808 may alter the light generated by light source 1802 (e.g., by way of image rendering) to modify (e.g., pre-distort) the image so that the aberration of the image caused by eye 1801 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 19:
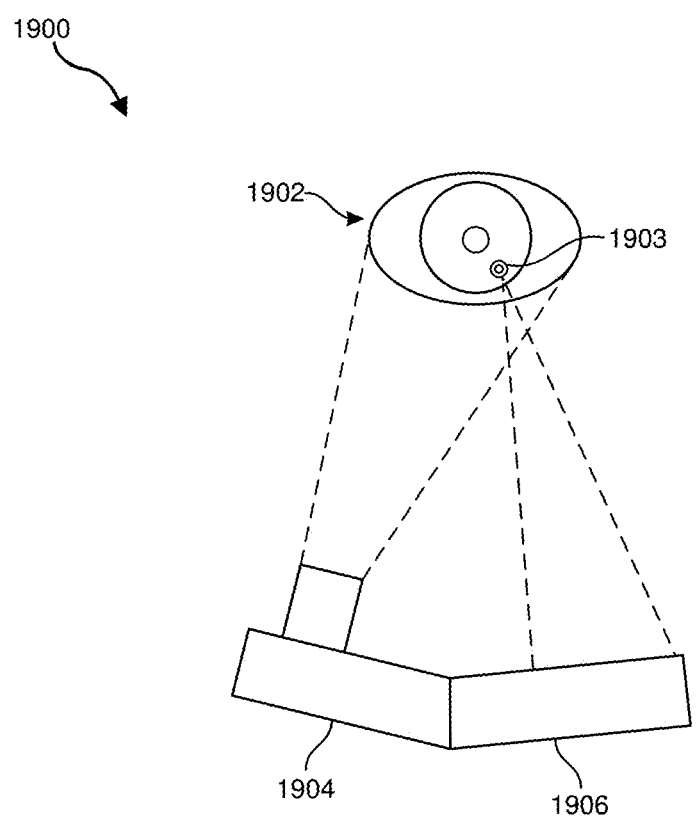
FIG. 19 is a more detailed illustration of various aspects of the eye-tracking subsystem illustrated in FIG. 18.
Figure 19:
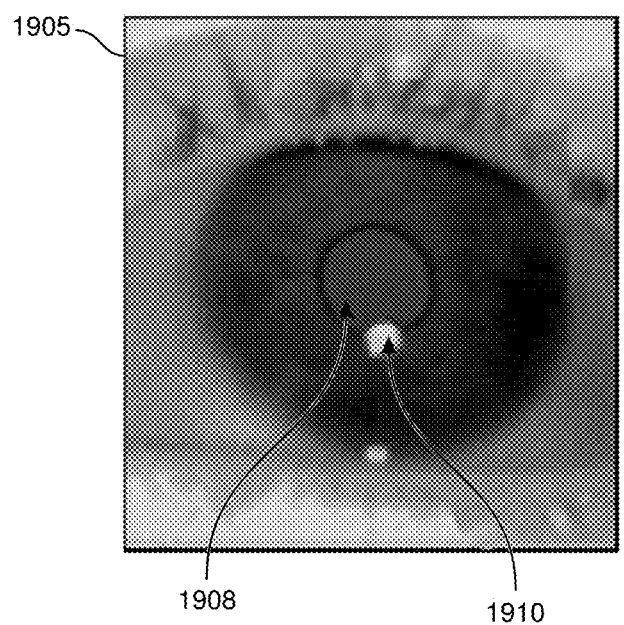

FIG. 19 is a more detailed illustration of various aspects of the eye-tracking subsystem illustrated in FIG. 18. As shown in this figure, an eye-tracking subsystem 1900 may include at least one source 1904 and at least one sensor 1906. Source 1904 generally represents any type or form of element capable of emitting radiation. In one example, source 1904 may generate visible, infrared, and/or near-infrared radiation. In some examples, source 1904 may radiate non-collimated infrared and/or near-infrared portions of the electromagnetic spectrum towards an eye 1902 of a user. Source 1904 may utilize a variety of sampling rates and speeds. For example, the disclosed systems may use sources with higher sampling rates in order to capture fixational eye movements of a user's eye 1902 and/or to correctly measure saccade dynamics of the user's eye 1902. As noted above, any type or form of eye-tracking technique may be used to track the user's eye 1902, including optical-based eye-tracking techniques, ultrasound-based eye-tracking techniques, etc.

Sensor 1906 generally represents any type or form of element capable of detecting radiation, such as radiation reflected off the user's eye 1902. Examples of sensor 1906 include, without limitation, a charge coupled device (CCD), a photodiode array, a complementary metal-oxide-semiconductor (CMOS) based sensor device, and/or the like. In one example, sensor 1906 may represent a sensor having predetermined parameters, including, but not limited to, a dynamic resolution range, linearity, and/or other characteristic selected and/or designed specifically for eye tracking.

As detailed above, eye-tracking subsystem 1900 may generate one or more glints. As detailed above, a glint 1903 may represent reflections of radiation (e.g., infrared radiation from an infrared source, such as source 1904) from the structure of the user's eye. In various embodiments, glint 1903 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 19 shows an example image 1905 captured by an eye-tracking subsystem, such as eye-tracking subsystem 1900. In this example, image 1905 may include both the user's pupil 1908 and a glint 1910 near the same. In some examples, pupil 1908 and/or glint 1910 may be identified using an artificial-intelligence-based algorithm, such as a computer-vision-based algorithm. In one embodiment, image 1905 may represent a single frame in a series of frames that may be analyzed continuously in order to track the eye 1902 of the user. Further, pupil 1908 and/or glint 1910 may be tracked over a period of time to determine a user's gaze.

In one example, eye-tracking subsystem 1900 may be configured to identify and measure the inter-pupillary distance (IPD) of a user. In some embodiments, eye-tracking subsystem 1900 may measure and/or calculate the IPD of the user while the user is wearing the artificial reality system. In these embodiments, eye-tracking subsystem 1900 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1800 and/or eye-tracking subsystem 1900 may be incorporated into augmented-reality system 1300 in FIG. 13 and/or virtual-reality system 1400 in FIG. 14 to enable these systems to perform various eye-tracking tasks (including one or more of the eye-tracking operations described herein).

Figure 20A:
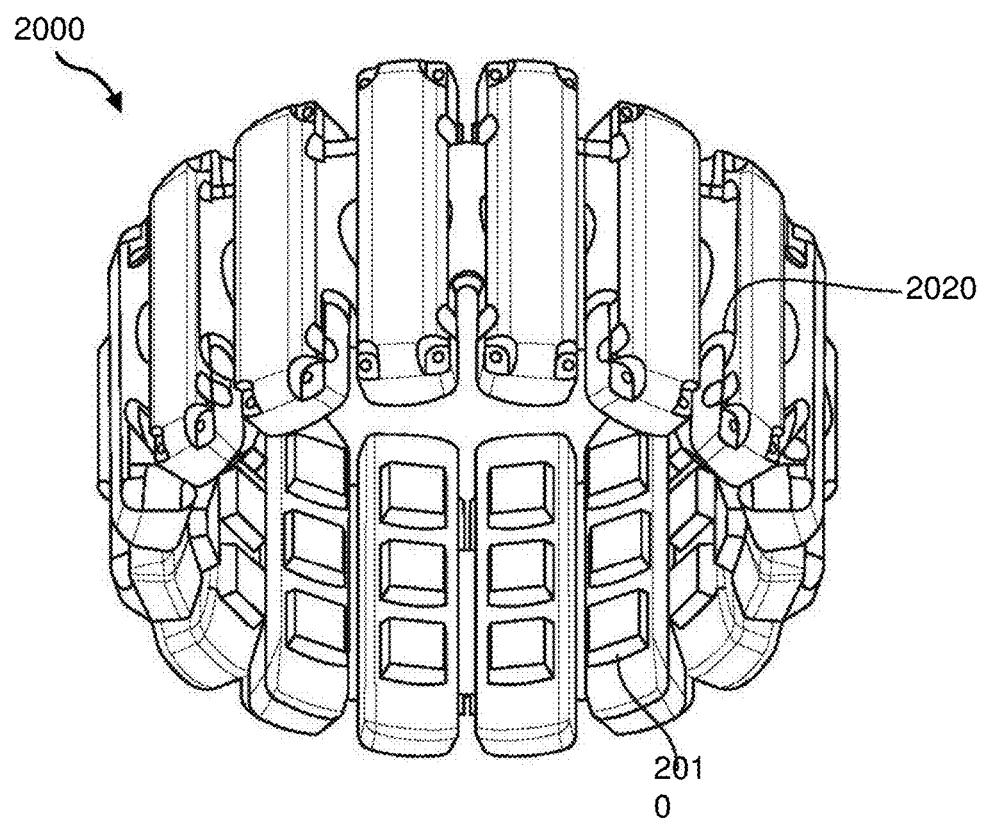
FIGS. 20A and 20B are illustrations of an exemplary human-machine interface configured to be worn around a user's lower arm or wrist.
Figure 20B:
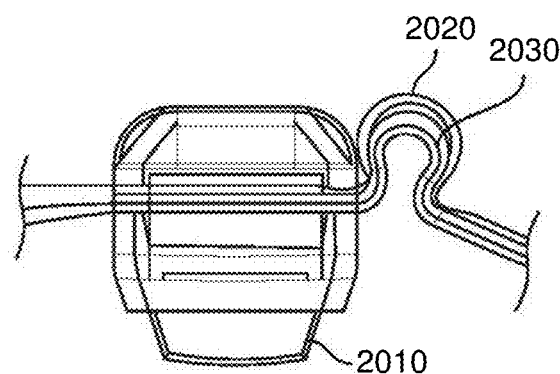

FIG. 20A illustrates an exemplary human-machine interface (also referred to herein as an EMG control interface) configured to be worn around a user's lower arm or wrist as a wearable system 2000. In this example, wearable system 2000 may include sixteen neuromuscular sensors 2010 (e.g., EMG sensors) arranged circumferentially around an elastic band 2020 with an interior surface 2030 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 20B illustrates a cross-sectional view through one of the sensors of the wearable device shown in FIG. 20A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 2010 is discussed in more detail below with reference to FIGS. 21A and 21B.

Figure 21A:
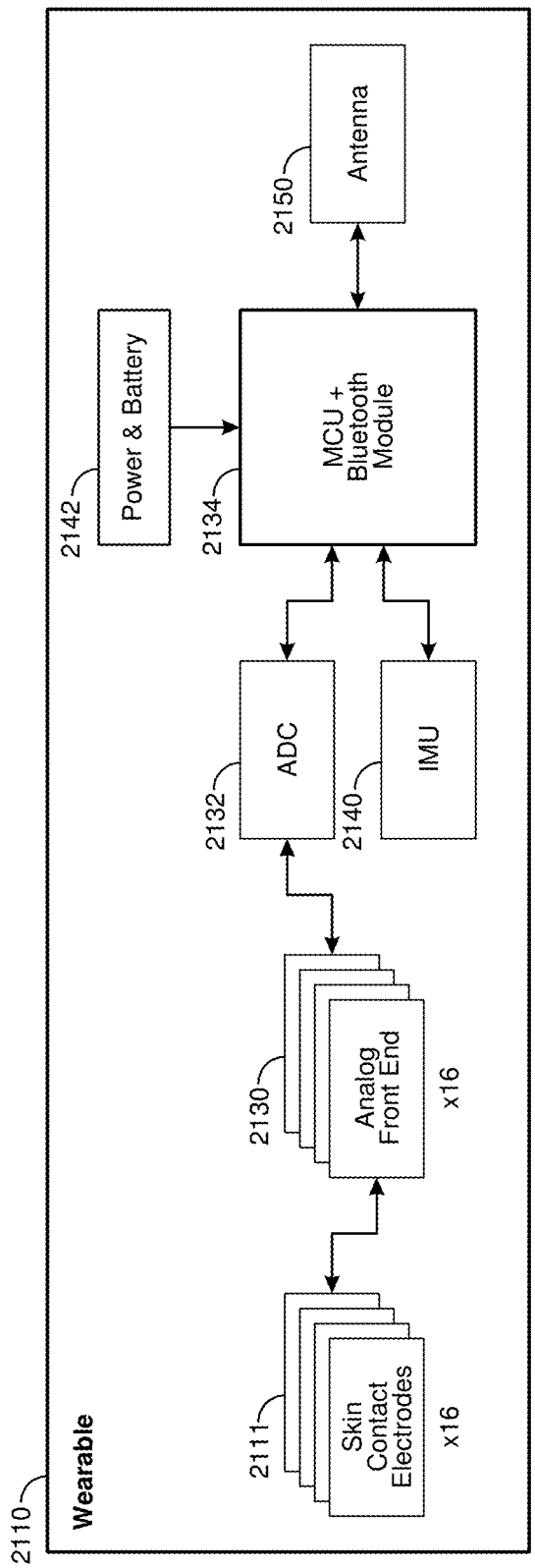
FIGS. 21A and 21B are illustrations of an exemplary schematic diagram with internal components of a wearable system.
Figure 21B:
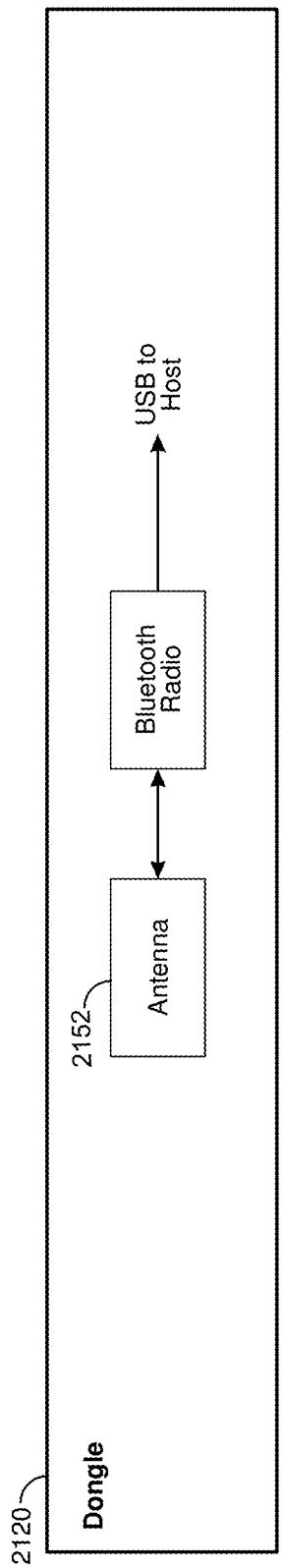

FIGS. 21A and 21B illustrate an exemplary schematic diagram with internal components of a wearable system with EMG sensors. As shown, the wearable system may include a wearable portion 2110 (FIG. 21A) and a dongle portion 2120 (FIG. 21B) in communication with the wearable portion 2110 (e.g., via BLUETOOTH or another suitable wireless communication technology). As shown in FIG. 21A, the wearable portion 2110 may include skin contact electrodes 2111, examples of which are described in connection with FIGS. 20A and 20B. The output of the skin contact electrodes 2111 may be provided to analog front end 2130, which may be configured to perform analog processing (e.g., amplification, noise reduction, filtering, etc.) on the recorded signals. The processed analog signals may then be provided to analog-to-digital converter 2132, which may convert the analog signals to digital signals that can be processed by one or more computer processors. An example of a computer processor that may be used in accordance with some embodiments is microcontroller (MCU) 2134, illustrated in FIG. 21A. As shown, MCU 2134 may also include inputs from other sensors (e.g., IMU sensor 2140), and power and battery module 2142. The output of the processing performed by MCU 2134 may be provided to antenna 2150 for transmission to dongle portion 2120 shown in FIG. 21B.

Dongle portion 2120 may include antenna 2152, which may be configured to communicate with antenna 2150 included as part of wearable portion 2110. Communication between antennas 2150 and 2152 may occur using any suitable wireless technology and protocol, non-limiting examples of which include radiofrequency signaling and BLUETOOTH. As shown, the signals received by antenna 2152 of dongle portion 2120 may be provided to a host computer for further processing, display, and/or for effecting control of a particular physical or virtual object or objects.

Although the examples provided with reference to FIGS. 20A-20B and FIGS. 21A-21B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a real-time output of a recognition model to be transformed, transform the real-time output of the recognition model into a level of uncertainty, output a result of the transformation to a feedback system for subsequent communication to a user, and/or use the result of the transformation to modulate at least one attribute of an appropriate and/or suitable feedback for presentation to the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    receiving information associated with a real-time output of a recognition model, the recognition model being adapted to recognize at least one behavior of a user;
    determining, based on the information, a level of uncertainty associated with the real-time output;
    modulating at least one attribute of feedback to convey the level of uncertainty; and
    conveying the level of uncertainty to the user by presenting the feedback to the user substantially contemporaneous with the real-time output of the recognition model.

2. The computer-implemented method of claim 1, wherein:
the information associated with the real-time output of the recognition model comprises a probability of the user performing the behavior;
the computer-implemented method further comprises at least one of:
performing a user-input operation when the probability of the user performing the behavior is above a predetermined threshold; or
refraining from performing the user-input operation when the probability of the user performing the behavior is below the predetermined threshold; and
the level of uncertainty associated with the real-time output is determined based on a distance between the probability and the predetermined threshold, the level of uncertainty being inversely proportional to the distance.

3. The computer-implemented method of claim 1, wherein:
the information associated with the real-time output of the recognition model comprises a probability of the user performing the behavior; and
the attribute of the feedback is modulated to have a level of perceivability proportional to the probability of the user performing the behavior.

4. The computer-implemented method of claim 1, wherein the attribute of the feedback is modulated to have a level of perceivability proportional to the level of uncertainty associated with the real-time output.

5. The computer-implemented method of claim 1, wherein:
the recognition model comprises a pinch recognition model adapted to output probabilities of the user performing a pinch gesture;
the information comprises a probability of the user performing the pinch gesture;
the computer-implemented method further comprises performing a user-input operation when the probability of the user performing the pinch gesture is above a predetermined threshold; and
the feedback is presented to the user contemporaneous with performing the user-input operation when the probability of the user performing the pinch gesture is above the predetermined threshold.

6. The computer-implemented method of claim 1, wherein:
the recognition model comprises a pinch recognition model adapted to output probabilities of the user performing a pinch gesture;
the information comprises a probability of the user performing the pinch gesture;
the computer-implemented method further comprises refraining from performing a user-input operation when the probability of the user performing the pinch gesture is below a predetermined threshold; and
the feedback is presented to the user contemporaneous with determining that the probability of the user performing the pinch gesture is below the predetermined threshold.

7. The computer-implemented method of claim 1, wherein:
the recognition model comprises a hand-tracking model adapted to output:
position or orientation information for one or more portions of the user's hand; and
a confidence level of the position or orientation information; and
the level of uncertainty associated with the real-time output is determined based on the confidence level, the level of uncertainty being inversely proportional to the confidence level.

8. The computer-implemented method of claim 1, wherein:
the feedback is haptic feedback; and
at least one attribute of the haptic feedback is based on the level of uncertainty associated with the real-time output.

9. The computer-implemented method of claim 1, wherein:
the feedback is a vibration; and
at least one attribute of the vibration is based on the level of uncertainty associated with the real-time output.

10. The computer-implemented method of claim 1, wherein modulating the attribute of the feedback to convey the level of uncertainty comprises modulating one or more of:
an amplitude of the feedback to convey the level of uncertainty to the user;
a frequency of the feedback to convey the level of uncertainty to the user;
a duration of the feedback to convey the level of uncertainty to the user;
a pattern of the feedback to convey the level of uncertainty to the user; and
a spatialization of the feedback to convey the level of uncertainty to the user.

11. The computer-implemented method of claim 1, wherein the feedback indicates a method for reducing the level of uncertainty of the real-time output.

12. The computer-implemented method of claim 1, further comprising:
receiving additional information associated with an additional real-time output of the recognition model;
determining, based on the additional information, an additional level of uncertainty associated with the additional real-time output; and
modulating the attribute of the feedback to convey the additional level of uncertainty.

13. A system comprising:
at least one physical processor; and
physical memory comprising computer-executable instructions that, when executed by the physical processor, cause the physical processor to:
receive information associated with a real-time output of a recognition model, the recognition model being adapted to recognize at least one behavior of a user;
determine, based on the information, a level of uncertainty associated with the real-time output;
modulate at least one attribute of feedback to convey the level of uncertainty; and
convey the level of uncertainty to the user by presenting the feedback to the user substantially contemporaneous with the real-time output of the recognition model.

14. The system of claim 13, wherein:
the information associated with the real-time output of the recognition model comprises a probability of the user performing the behavior;
the computer-executable instructions, when executed by the physical processor, further cause the physical processor to:

perform a user-input operation when the probability of the user performing the behavior is above a predetermined threshold; or refrain from performing the user-input operation when the probability of the user performing the behavior is below the predetermined threshold; and the level of uncertainty associated with the real-time output is determined based on a distance between the probability and the predetermined threshold, the level of uncertainty being inversely proportional to the distance.

15. The system of claim 13, wherein:

the information associated with the real-time output of the recognition model comprises a probability of the user performing the behavior; and the attribute of the feedback is modulated to have a level of perceivability proportional to the probability of the user performing the behavior.

16. The system of claim 13, wherein the attribute of the feedback is modulated to have a level of perceivability proportional to the level of uncertainty associated with the real-time output.

17. The system of claim 13, wherein:

the recognition model comprises a pinch recognition model adapted to output probabilities of the user performing a pinch gesture;

the information comprises a probability of the user performing the pinch gesture;

the computer-executable instructions, when executed by the physical processor, further cause the physical processor to perform a user-input operation when the probability of the user performing the pinch gesture is above a predetermined threshold; and the feedback is presented to the user contemporaneous with performing the user-input operation when the probability of the user performing the pinch gesture is above a predetermined threshold.

18. The system of claim 13, wherein:

the recognition model comprises a pinch recognition model adapted to output probabilities of the user performing a pinch gesture;

the information comprises a probability of the user performing the pinch gesture;

the computer-executable instructions, when executed by the physical processor, further cause the physical processor to refrain from performing a user-input operation when the probability of the user performing the pinch gesture is below a predetermined threshold; and the feedback is presented to the user contemporaneous with determining that the probability of the user performing the pinch gesture is below the predetermined threshold.

19. The system of claim 13, wherein:

the recognition model comprises a hand-tracking model adapted to output:

position or orientation information for one or more portions of the user's hand; and a confidence level of the position or orientation information; and the level of uncertainty associated with the real-time output is determined based on the confidence level, the level of uncertainty being inversely proportional to the confidence level.

20. A non-transitory computer-readable medium comprising one or more computer-executable instructions that, when executed by at least one processor of a computing device, cause the computing device to:

receive information associated with a real-time output of a recognition model, the recognition model being adapted to recognize at least one behavior of a user;

determine, based on the information, a level of uncertainty associated with the real-time output;

modulate at least one attribute of feedback to convey the level of uncertainty; and convey the level of uncertainty to the user by presenting the feedback to the user substantially contemporaneous with the real-time output of the recognition model.

* * * * *